(12) United States Patent
Yamaoka et al.

(10) Patent No.: US 9,260,324 B2
(45) Date of Patent: Feb. 16, 2016

(54) FLOW PASSAGE CONTROL VALVE

(71) Applicant: MIURA Co., Ltd., Ehime (JP)

(72) Inventors: Shinya Yamaoka, Ehime (JP); Hajime Abe, Ehime (JP)

(73) Assignee: MIURA CO., LTD., Ehime (JP)

( * ) Notice: Subject to any disclaimer, the term of this patent is extended or adjusted under 35 U.S.C. 154(b) by 0 days.

(21) Appl. No.: 14/422,662

(22) PCT Filed: Sep. 28, 2012

(86) PCT No.: PCT/JP2012/075099
§ 371 (c)(1),
(2) Date: Feb. 19, 2015

(87) PCT Pub. No.: WO2014/049836
PCT Pub. Date: Apr. 3, 2014

(65) Prior Publication Data
US 2015/0225259 A1  Aug. 13, 2015

(51) Int. Cl.
*C02F 1/42* (2006.01)
*F16K 11/18* (2006.01)
*F16K 31/524* (2006.01)
*C02F 1/00* (2006.01)
*F16K 11/16* (2006.01)
*B01J 49/00* (2006.01)

(52) U.S. Cl.
CPC ............... *C02F 1/42* (2013.01); *B01J 49/0086* (2013.01); *C02F 1/006* (2013.01); *F16K 11/166* (2013.01); *F16K 11/18* (2013.01); *F16K 31/524* (2013.01); *F16K 31/52408* (2013.01); *B01J 49/0095* (2013.01); *C02F 2001/422* (2013.01); *C02F 2001/425* (2013.01); *C02F 2001/427* (2013.01); *C02F 2201/005* (2013.01); *C02F 2301/043* (2013.01); *C02F 2303/16* (2013.01); *Y10T 137/87732* (2015.04)

(58) Field of Classification Search
CPC ............... C02F 1/42; C02F 2001/422; C02F 2001/425; C02F 2001/427; C02F 2201/005; C02F 2301/043; C02F 2303/16; B01J 49/0086; B01J 40/0095; F16K 11/18; F16K 31/52408
USPC .......................................... 210/190, 191, 278
See application file for complete search history.

(56) References Cited

U.S. PATENT DOCUMENTS 2,012,194 A * 8/1935 Hughes ........................... 210/89
2,616,446 A * 11/1952 Ivanek ........................... 137/627

(Continued)

FOREIGN PATENT DOCUMENTS

CN  101407346 A  4/2009
JP  S50-58050 U  5/1975

(Continued)

*Primary Examiner* — Matthew O Savage
(74) *Attorney, Agent, or Firm* — Muncy, Geissler, Olds & Lowe, P.C.

(57) ABSTRACT

There is provided a flow passage control valve provided with a plurality of valves in a valve housing formed with set flow passages. A camshaft for operating each of the valves is provided along a right and left direction at the upper part of the valve housing. The respective valves are arranged so as to be divided front and rear into a first valve group and a second valve group with the camshaft as a border therebetween. The first valve group includes a first water passage valve, a second water passage valve, and a bypass valve. The second valve group includes the remaining valves that are not included in the first valve group.

16 Claims, 18 Drawing Sheets

(56) References Cited

U.S. PATENT DOCUMENTS

| | | | |
|---|---|---|---|
| 2,662,549 A * | 12/1953 | Rhinehart et al. | ............ 137/637 |
| 3,794,061 A | 2/1974 | Horvath et al. | |
| 4,426,294 A | 1/1984 | Seal | |
| 4,919,314 A | 4/1990 | Nishiyama et al. | |
| 5,910,244 A | 6/1999 | Stamos et al. | |
| 6,596,159 B1 | 7/2003 | Maruyama et al. | |
| 8,356,628 B2 | 1/2013 | Quinn et al. | |
| 2007/0181193 A1 | 8/2007 | Honzelka et al. | |
| 2007/0205145 A1 | 9/2007 | Carnell | |
| 2007/0227976 A1 * | 10/2007 | Furukawa et al. | ............ 210/662 |
| 2009/0084451 A1 | 4/2009 | Quinn et al. | |

FOREIGN PATENT DOCUMENTS

| | | |
|---|---|---|
| JP | S59-39382 A | 3/1984 |
| JP | S62/31781 A | 2/1987 |
| JP | S64-67294 A | 3/1989 |
| JP | H9-296879 A | 11/1997 |
| JP | H9-297150 A | 11/1997 |
| JP | 2001-239263 A | 9/2001 |
| JP | 2002-28646 A | 1/2002 |
| JP | 2007-78092 A | 3/2007 |
| JP | 2008-55392 A | 3/2008 |
| JP | 2009-525864 A | 7/2009 |
| JP | 2009-172461 A | 8/2009 |
| JP | 2010-60130 A | 3/2010 |
| JP | 2012-157793 A | 8/2012 |
| JP | 2012-166132 A | 9/2012 |
| JP | 2012-170932 A | 9/2012 |
| KR | 10-0210722 B1 | 7/1999 |
| WO | WO 93/07966 A1 | 4/1993 |

* cited by examiner

| | | WATER PASSING | REGENERATION WAITING | BACKWASH | REGENERATION | DISPLACEMENT | RINSE | WATER REFILLING | WATER-PASSING WAITING |
|---|---|---|---|---|---|---|---|---|---|
| FIRST WATER PASSAGE VALVE | 6 | ▨ | | | | | | | |
| BYPASS VALVE | 8 | | ▨ | ▨ | ▨ | ▨ | ▨ | ▨ | ▨ |
| SECOND WATER PASSAGE VALVE | 7 | ▨ | | | | | | | |
| RINSE DRAIN VALVE | 10 | | | ▨ | | | ▨ | | |
| BACKWASH DRAIN VALVE | 9 | | | ▨ | | | | | |
| REGENERATION DRAIN VALVE | 11 | | | | ▨ | ▨ | | | |
| DISTRIBUTION VALVE | 13 | | | | ▨ | ▨ | | | |
| REGENERATION VALVE | 12 | | | | ▨ | | | ▨ | |

FIG. 2

FLOW PASSAGE CONTROL VALVE

TECHNICAL FIELD

The present invention relates to a flow passage control valve used for opening/closing or switching a flow passage, and more particularly to a flow passage control valve for an ion exchange apparatus including an ion exchange resin bed.

BACKGROUND ART

Conventionally, there have been known hard water softening apparatuses including an ion exchange resin bed as disclosed in the following Patent Document 1. In this kind of hard water softening apparatus, when raw water passes an ion exchange resin bed, hardness components (i.e., calcium ions and magnesium ions) contained in the raw water are exchanged with sodium ions of the ion exchange resin bed. Thus, the hardness components in the raw water are adsorbed to be removed in the ion exchange resin bed, so that it is possible to soften the raw water.

The hard water softening apparatus is an apparatus that exchange sodium ions bonded to the ion exchange resin bed with the hardness components contained in the raw water, and therefore there is a limit to the removal of the hardness components. Therefore, before reaching the limit, exchange capacity is recovered by passing regenerant through the ion exchange resin bed (salt water in the case of the hard water softening apparatus). This is referred to as regeneration of an ion exchange resin bed.

In the hard water softening apparatus, a flow passage is changed according to each of processes such as a water passing process of softening raw water, and a regeneration process of regenerating an ion exchange resin bed. To do the above, a flow passage control valve is provided on the upper part of a pressure tank that houses the ion exchange resin bed, so that the flow passage according to each process is defined by this flow passage control valve. Such a configuration is not limited to the hard water softening apparatus, but is similar to other ion exchange apparatuses including an ion exchange resin bed. That is, the flow passage control valve is also used in an ion exchange apparatus that performs regeneration by passing regenerant through an ion exchange resin bed while passing raw water through the ion exchange resin bed.

As such a flow passage control valve, there has been known a valve disclosed in the following Patent Document 2. This valve (1) includes a valve housing (4) formed with a fluid flow passage (7), and a first port (5) and a second port (6) that serve as doorways to the fluid flow passage (7), and is formed with a valve seat (8) in the middle of the fluid flow passage (7). While a valve body (11) that opens/closes a valve hole (9) of the valve seat (8) is urged to the valve seat (8) by a spring (30), the valve body (11) can be pressed back against this urging force by a valve stem (16).

At the lower part of the valve body (11), a diaphragm-like pressure receiving body (22) is held by a retainer (21), and the spring (30) is provided in the lower part of this retainer (21). In the lower part of the housing (4), a back pressure chamber (28) divided from the fluid flow passage (7) by the pressure receiving body (22) is formed. This back pressure chamber (28) is ordinarily communicated with the first port (5) by a pressure transmission passage (32) formed in the valve body (11), and a through passage (33) formed in the retainer (21).

In a closed state where the valve body (11) is in contact with the valve seat (8), pressure on a side close to the first port (5) is transmitted to the back pressure chamber (28), so that fluid pressure in a valve opening direction and fluid pressure in a valve closing direction applied to the valve body (11) are balanced. Consequently, the urging force of the spring (30) does not need to be increased, and driving force required for opening the valve can be reduced.

Patent Document 1: Japanese Patent Laid-open Publication No. 2008-55392

Patent Document 2: Japanese Patent Laid-open Publication No. 2007-78092

DISCLOSURE OF THE INVENTION

Problems to be Solved by the Invention

The flow passage control valve changes the flow passage according to a process, and therefore it is necessary to arrange the valve considering easy arrangement of the flow passage in each process. Additionally, in the water passing process of treating raw water, it is necessary to increase the diameter of the flow passage used in the water passing process, in order to provide a large water flow capacity, and spaces required for the respective valves are different with increase in the diameters, and therefore it is necessary to arrange the valves considering this difference in spaces.

Furthermore, in the valve described in the above Patent Document 2, a diaphragm-like pressure receiving body is required, and a labor is also required for mounting the diaphragm-like pressure receiving body. Accordingly, there is room for the improvement of the structure, assembly, and maintenance of the valve.

A problem to be solved by the present invention is to provide a flow passage control valve in which the arrangement of a flow passage in each process is facilitated, and a large water flow capacity can be provided. Additionally, a problem is to provide a flow passage control valve which enables easy assembly and maintenance with a simple configuration.

Means for Solving the Problems

In the present invention, a first aspect of the present invention is a flow passage control valve connected to a pressure tank for housing an ion exchange resin bed, and a regenerant tank for storing regenerant of the ion exchange resin bed, which includes: a plurality of valves provided in a valve housing formed with set flow passages, wherein a camshaft for operating each of the valves is provided at an upper part of the valve housing along a right and left direction, the plurality of valves are arranged so as to be divided front and rear into a first valve group and a second valve group with the camshaft as a border therebetween, in the first valve group, a first water passage valve that is provided in a first water passage leading from a raw water inlet to the pressure tank, a second water passage valve that is provided in a second water passage leading from the pressure tank to a treated water outlet, and a bypass valve that is provided in a bypass passage for connecting the first water passage and the second water passage are laterally arranged side by side, a regeneration valve that is provided in a regenerant passage for allowing the regenerant of the ion exchange resin bed to pass is included in either the first valve group or the second valve group, and in the second valve group, remaining valves that are not included in the first valve group are laterally arranged side by side.

According to the first aspect of the present invention, the valves are divided into the first valve group and the second valve group with the camshaft as the border therebetween, the valves for a water passing system, namely, the first water passage valve, the second water passage valve, and the bypass valve are arranged in the first valve group, the valves for a regeneration system other than these valves are arranged in the second valve group, and the regeneration valve is included in any of the valve groups. The valves for a water passing system and the valves for a regeneration system are divided, so that the flow passage for each process is easily arranged. Additionally, the diameter of each valve for a water passing system is increased, so that a large water flow capacity can be provided.

According to a second aspect of the present invention, in the first aspect of the present invention, the pressure tank includes an upper water passage port, a lower water passage port, and a central water passage port, the valve housing includes a regenerant port connected to the regenerant tank, in addition to the raw water inlet, the treated water outlet, and a drain outlet, the valve housing is provided with an ejector that sucks the regenerant from the regenerant tank, a flow passage on an outlet side of the ejector is branched into a first regeneration passage leading to the upper water passage port, and a second regeneration passage leading to the lower water passage port, the first water passage valve is provided in the first water passage leading from the raw water inlet to the upper water passage port, the second water passage valve is provided in the second water passage leading from the lower water passage port to the treated water outlet, the bypass valve is provided in the bypass passage for connecting the first water passage on a side closer to the raw water inlet than the first water passage valve, and the second water passage on a side closer to the treated water outlet than the second water passage valve, a backwash drain valve is provided in a backwash drain passage leading from the upper water passage port to the drain outlet, a rinse drain valve is provided in a rinse drain passage leading from the lower water passage port to the drain outlet, a regeneration drain valve is provided in a regeneration drain passage leading from the central water passage port to the drain outlet, the regeneration valve is provided in the regenerant passage leading from the regenerant port to a suction port of the ejector, a distribution valve is provided in the second regeneration passage, the first valve group includes the first water passage valve, the second water passage valve, and the bypass valve, the second valve group includes the backwash drain valve, the rinse drain valve, the regeneration drain valve, and the distribution valve, and the regeneration valve is included in either the first valve group or the second valve group.

According to the second aspect of the present invention, the pressure tank includes the upper water passage port, the lower water passage port, and the central water passage port, thereby enabling split flow regeneration (split-flow regeneration) in which regenerant is supplied from the upper water passage port and the lower water passage port, and regeneration drainage after ion exchange is ejected from the central water passage port. Additionally, the valves for a water passing system, namely the first water passage valve, the second water passage valve, and the bypass valve are arranged in the first valve group, the valves for a regeneration system, namely the backwash drain valve, the rinse drain valve, the regeneration drain valve, and the distribution valve are arranged in the second valve group, and the regeneration valve is included in any of the valve groups. The valves for a water passing system and the valves for a regeneration system are divided, so that the flow passage for each process is easily arranged. Additionally, the number of the valves in the first valve group is smaller than the number of the valves in the second valve group, and therefore even when a valve of which diameter is relatively large is used as the water passage valve or the bypass valve, the whole of the flow passage control valve is compactly housed. Consequently, the diameter of each valve for a water passing system is increased, so that a large water flow capacity can be provided.

According to a third aspect of the present invention, in the second aspect of the present invention, as arrangement of the respective valves in the first valve group and the second valve group, the bypass valve is arranged between the first water passage valve and the second water passage valve, the backwash drain valve and the rinse drain valve are arranged adjacent to each other, and the regeneration drain valve is arranged adjacent to the valves, the regeneration valve and the distribution valve are arranged adjacent to each other or arranged so as to face each other, the raw water inlet and the treated water outlet are provided on a side of the first valve group, and the drain outlet is provided on a side of the second valve group.

According to the third aspect of the present invention, the bypass valve is arranged between the first water passage valve and the second water passage valve, so that the bypass passage is easily arranged between the first water passage and the second water passage. In addition, the raw water inlet and the treated water outlet are provided on the side of the first valve group, so that the valves for a water passing system can be completely collected. Additionally, the backwash drain valve, the rinse drain valve, and the regeneration drain valve are collected, so that the flow passages for a drainage system are easily arranged. In addition, the drain outlet is provided on the side of the second valve group, so that the valves for a regeneration system can be completely collected. Furthermore, the regeneration valve and the distribution valve are collected, so that the flow passages for regenerant are easily arranged.

According to a fourth aspect of the present invention, in the first to third aspects of the present invention, each of the valves is retractably provided with a valve piston in a valve housing hole formed in the valve housing, the valve housing hole is formed with a first opening and a second opening serving as doorways of fluid to the valve housing hole, at axially separated positions, and is provided with a valve seat part between the first opening and the second opening, the valve piston is provided with a first seal material and a second seal material at axially separated positions, and in a state where communication between the first opening on a distal end side and the second opening on a proximal end side is blocked by bringing the valve seat part into contact with the first seal material, the second seal material forms a chamber in a proximal end of the valve housing hole, and the chamber is communicated with the first opening through a communication hole of the valve piston.

According to the fourth aspect of the present invention, in the valve closing state, the chamber is formed in the proximal end of the valve housing hole, and this chamber is communicated with the first opening on the distal end side through the communication hole of the valve piston. Consequently, it is possible to balance a part of or all of fluid pressure in the valve opening direction and a part of or all of fluid pressure in the valve closing direction, which are applied to the valve piston.

According to a fifth aspect of the present invention, in the fourth aspect of the present invention, the valve housing hole is horizontally provided so as to be opened to outside in a front and rear direction of the valve housing, and is provided with the first opening and the second opening in a lower part of a peripheral side wall, the valve housing hole incorporates a valve frame, the valve piston, and a spring in order, and an opening is sealed by a detachable valve cap, the valve frame has a substantially cylindrical shape in which an opening is formed in a peripheral side wall, allows communication between the first opening and the second opening only through an inner hole, is provided with an annular valve seat part in an axial middle part, and is retractably provided with a valve shaft in a distal end in a watertight state, the valve piston is urged to a distal end side by the spring, and is capable of being pressed back to a proximal end side by the valve shaft against urging force, and the valve shaft is retractably operated by a cam provided in the camshaft.

According to the fifth aspect of the present invention, the valve housing hole is horizontally provided so as to be opened to the outside in the front and rear direction of the valve housing, and is provided with the first opening and the second opening in the lower part of the peripheral side wall, and therefore it is possible to arrange the cam and the camshaft between the valve groups located in the front and the rear, at the upper part of the valve housing. Additionally, the valve housing hole incorporates the valve frame, the valve piston, and the spring in order, and the opening is sealed by the valve cap, and therefore the assembly and the maintenance of the valve are facilitated. Additionally, the valve housing hole is formed with the valve frame, and the valve frame is retractably provided with the valve piston, and therefore the sliding area of the valve piston can be reduced. In addition, the opening is formed in the peripheral side wall of the valve frame, and therefore it is possible to secure a water flow passage to reduce a pressure loss.

According to a sixth aspect of the present invention, in the fourth aspect of the present invention, the valve housing hole is vertically provided so as to be opened to an upper side of the valve housing, is formed with the first opening in a peripheral side wall below the valve seat part or a lower wall, and is formed with the second opening in a peripheral side wall above the valve seat part, the valve housing hole incorporates the valve piston, and an opening is sealed by a detachable valve cap, an upper end of the valve piston passes through the valve cap in a watertight state, the valve piston has a lower end provided with the first seal material, and a vertical middle part provided with the second seal material, and the second seal material slides a cylinder of the valve cap, and the valve piston is retractably operated by a cam provided in the camshaft.

According to the sixth aspect of the present invention, the valve housing hole is vertically provided so as to be opened to the upper side of the valve housing, and is provided with the first opening and the second opening in the peripheral side wall or the lower wall, and therefore it is possible to arrange the cam and the camshaft between the valve groups located in the front and the rear, at the upper part of the valve housing. Additionally, the valve housing hole incorporates the valve piston, and the opening is sealed by the valve cap, and therefore assembly and maintenance are facilitated. Furthermore, the second seal material slides the cylinder of the valve cap, and therefore the chamber is easily and reliably formed in the proximal end of the valve housing hole.

According to a seventh aspect of the present invention, in the sixth aspect of the present invention, at the upper part of the valve housing, lever shafts are provided at a front and a rear of the camshaft, in parallel with the camshaft, each of the lever shafts is swingably provided with a plurality of levers, and each of the levers has a first end that is held by an upper end of the valve piston, and a second end that engages with a pin groove formed in a side surface of the cam, and moves the first end vertically according to a shape of the pin groove.

According to the seventh aspect of the present invention, the valve piston is pulled up by the lever to open the valve, or pressed inside to close the valve. Consequently, a spring for valve closing is unnecessary.

Furthermore, according to an eighth aspect of the present invention, in the fourth aspect of the present invention, the valve housing includes an ejector that sucks the regenerant from the regenerant tank, the ejector includes an ejector body and a nozzle leading to the ejector body, a water supply passage leading to the nozzle is provided with a strainer and a constant flow valve, and an ejector housing hole formed in the valve housing incorporates the ejector body, the nozzle, the strainer, and the constant flow valve, and an opening is sealed by a detachable lid material.

According to the eighth aspect of the present invention, the ejector housing hole incorporates the ejector body, the nozzle, the strainer, and the constant flow valve, and the opening is sealed by the lid material, and therefore the assembly and the maintenance of a regenerant introduction mechanism are facilitated.

Effects of the Invention

According to the flow passage control valve of the present invention, a flow passage for each process is easily arranged, and a large water flow capacity can be provided. Additionally, assembly and maintenance are facilitated with a simple configuration.

BRIEF DESCRIPTION OF THE DRAWINGS

FIG. 2 is a schematic diagram sequentially showing operation processes of the ion exchange apparatus of Embodiment 1, and showing opening/closing states of each of valves in each of the processes.

PREFERRED MODE FOR CARRYING OUT THE INVENTION

Hereinafter, specific embodiments of the present invention will be described in detail with reference to the drawings.
Embodiment 1

Figure 1:
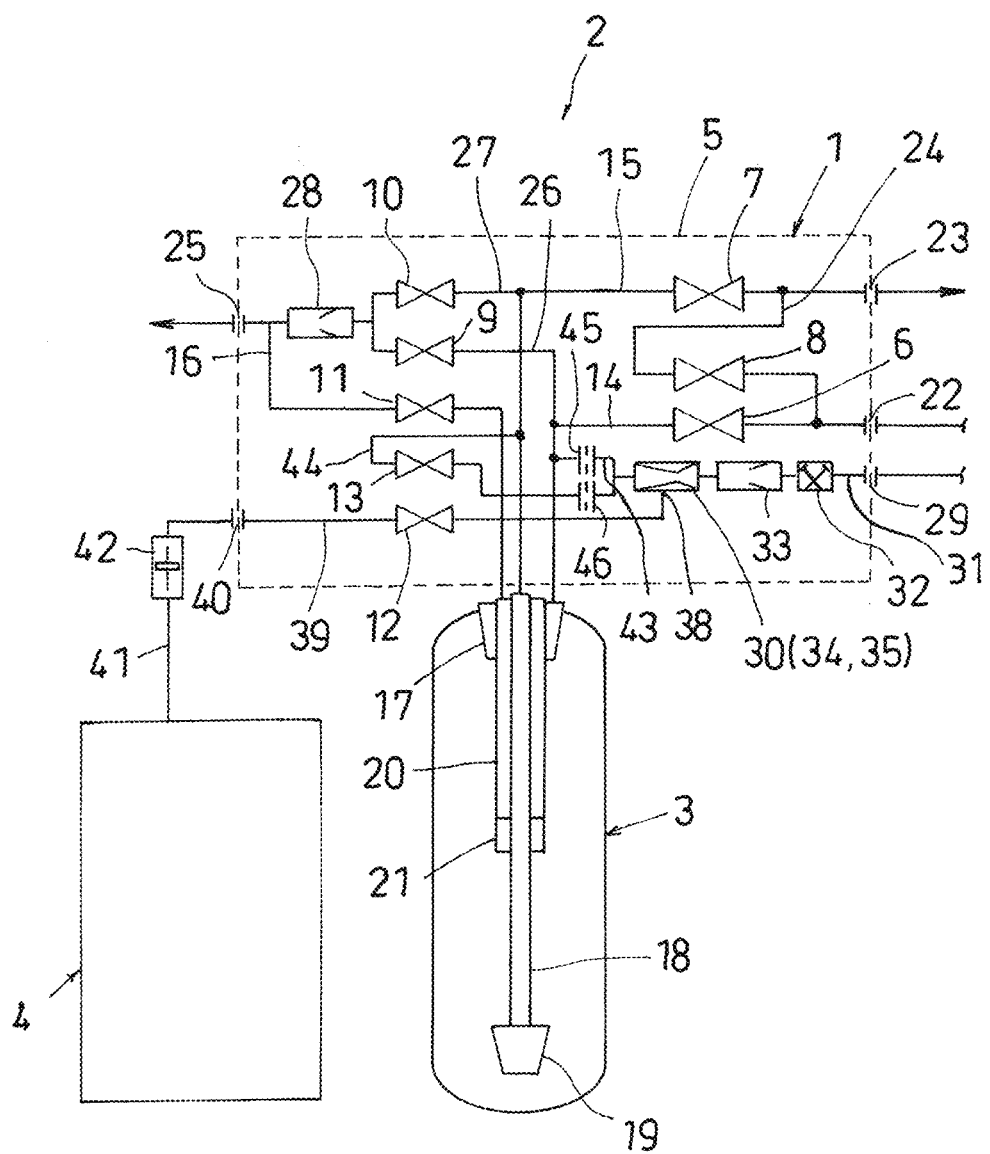
FIG. 1 is a schematic diagram showing an example of an ion exchange apparatus including a flow passage control valve of Embodiment 1 of the present invention.

FIG. 1 is a schematic diagram showing an example of an ion exchange apparatus 2 including a flow passage control valve 1 of Embodiment 1 of the present invention. The ion exchange apparatus 2 of this embodiment is a hard water softening apparatus that removes hardness components in raw water by using cation exchange resin. In this case, regenerant of an ion exchange resin bed is salt water (sodium hypochlorite aqueous solution).

Hereinafter, a whole configuration and an operation method of the ion exchange apparatus 2 will be first described in order, and thereafter a specific configuration of the flow passage control valve 1 of this embodiment will be described.
Whole Configuration of Ion Exchange Apparatus 2

The ion exchange apparatus 2 includes a pressure tank 3 and a regenerant tank 4, in addition to the flow passage control valve 1.

The flow passage control valve 1 is provided with a plurality of valves 6 to 13 in a valve housing 5 formed with set flow passages. The pressure tank 3 is a bottomed cylindrical hollow container, and houses an ion exchange resin bed formed from cation exchange resin beads. The regenerant tank 4 stores regenerant of the ion exchange resin bed in the pressure tank 3.

The flow passage control valve 1 is mounted on the upper part of the pressure tank 3. Consequently, an upper opening of the pressure tank 3 is closed by the valve housing 5 of the flow passage control valve 1. In the lower part of the valve housing 5, the respective ends of a first water passage 14, a second water passage 15 and a regeneration drain passage 16 are each opened at a position corresponding to the upper opening of the pressure tank 3.

The first water passage 14 is opened to an upper water passage port 17 in the pressure tank 3. The second water passage 15 is opened to a lower water passage port 19 in the pressure tank 3, through an inner pipe 18. The regeneration drain passage 16 is opened to a central water passage port 21 in the pressure tank 3, through an outer pipe 20.

The inner pipe 18 and the outer pipe 20 have upper ends which are held by the valve housing 5, and extend downward from the valve housing 5, to be inserted into the pressure tank 3. At this time, the inner pipe 18 and the outer pipe 20 form a double pipe structure in which the inner pipe 18 is inserted into a hollow hole of the outer pipe 20. The inner pipe 18 extends up to the lower part of the pressure tank 3, the outer pipe 20 extends up to the central part in a vertical direction of the pressure tank 3. The lower water passage port 19 is provided in the lower part of the inner pipe 18, and the central water passage port 21 is provided in the lower part of the outer pipe 20.

The valve housing 5 of the flow passage control valve 1 is provided with the first water passage 14 that feeds raw water from a raw water inlet 22 to the upper water passage port 17, and the second water passage 15 that feeds treated water (herein, soft water) from the lower water passage port 19 to a treated water outlet 23. The first water passage 14 is provided with a first water passage valve 6, and the second water passage 15 is provided with a second water passage valve 7.

The first water passage 14 on a side closer to the raw water inlet 22 than the first water passage valve 6, and the second water passage 15 on a side closer to the treated water outlet 23 than the second water passage valve 7 are connected by a bypass passage 24. This bypass passage 24 is provided with a bypass valve 8.

To the upper water passage port 17, a backwash drain passage 26 leading to a drain outlet 25 is connected. This backwash drain passage 26 is provided with a backwash drain valve 9. In FIG. 1, the first water passage 14 and the backwash drain passage 26 are shown as a common pipeline on the side of the pressure tank 3.

To the lower water passage port 19, a rinse drain passage 27 leading to the drain outlet 25 is also connected. This rinse drain passage 27 is provided with a rinse drain valve 10. In FIG. 1, the second water passage 15 and the rinse drain passage 27 are shown as a common pipeline on the side of the pressure tank 3. The downstreams of the backwash drain passage 26 and the rinse drain passage 27 are opened to the drain outlet 25 through a constant flow valve (rubber orifice) 28.

To the central water passage port 21, the regeneration drain passage 16 leading to the drain outlet 25 is connected. This regeneration drain passage 16 is provided with a regeneration drain valve 11. The downstreams of the backwash drain passage 26, the rinse drain passage 27, and the regeneration drain passage 16 are collected to be opened to the drain outlet 25.

The valve housing 5 is further provided with a driving water passage 31 that feeds driving water (raw water) from a driving water inlet 29 to an ejector 30. The driving water passage 31 is provided with a strainer 32, a constant flow valve (rubber orifice) 33, and the ejector 30 in order from the driving water inlet 29. Raw water to the raw water inlet 22, and driving water to the driving water inlet 29 can be used by branching water from the same water supply. Alternatively, the raw water inlet 22 and the driving water inlet 29 are integrated, and branched into the first water passage 14 and the driving water passage 31 inside the valve housing 5.

The ejector 30, the details of which will be described later (FIG. 8 and FIG. 9) includes an ejector body 34 and a nozzle 35, and the ejector body 34 includes a throat part 36, and a diffuser part 37. The driving water is jetted from the nozzle 35 to the distal end of the ejector body 34, so that regenerant is sucked from a suction port 38 of the ejector body 34, and mixed with driving water to be discharged. That is, driving water from the driving water passage 31 is supplied to the nozzle 35, and regenerant from a regenerant passage 39 is supplied to the suction port 38 of the ejector body 34. The regenerant passage 39 connects a regenerant port 40 of the valve housing 5 and the suction port 38 of the ejector body 34, and is provided with a regeneration valve 12. The regenerant tank 4 is connected to the regenerant port 40 of the valve housing 5, through a regenerant pipe 41, and the regenerant pipe 41 is provided with a regenerant flowmeter 42.

On the outlet side of the ejector body 34, bifurcated first and second regeneration passages 43 and 44 are provided. The first regeneration passage 43 is connected to the upper water passage port 17 through a first orifice 45. The second regeneration passage 44 is connected to the lower water passage port 19 through a second orifice 46, and a distribution valve 13. In FIG. 1, the first water passage 14, the backwash drain passage 26, and the first regeneration passage 43 are shown as a common pipeline on the side of the pressure tank 3. Additionally, the second water passage 15, the rinse drain passage 27, and the second regeneration passage 44 are shown as a common pipeline on the side of the pressure tank 3.

Operation Method of Ion Exchange Apparatus 2

FIG. 2 is a schematic diagram sequentially showing operation processes of the ion exchange apparatus 2 of this embodiment, and showing opening/closing states of each of the valves 6 to 13 in each of the processes. In this drawing, the shaded parts show the opening states of the respective valves 6 to 13, and the plain parts show the closing states. In the transition of the respective processes, the respective valves 6 to 13 may be gradually closed, or gradually opened.

The ion exchange apparatus 2 can be independently used, or two ion exchange apparatuses can be used. In the latter case, a raw water supply passage leading from a water supply source is simply connected to a raw water inlet 22 of a first ion exchange apparatus 2, a treated water supply passage leading to a treated water using facility is simply connected to a treated water outlet 23 of a second ion exchange apparatus 2, and a treated water outlet 23 of the first ion exchange apparatus 2 and a raw water inlet 22 of the second ion exchange apparatus 2 are simply connected by a bypass supply passage. In this case, during the treatment of raw water in one of the ion exchange apparatuses 2, the regeneration of an ion exchange resin bed can be performed in the other ion exchange apparatus 2.

The ion exchange apparatus 2 sequentially performs a water passing process, a regeneration waiting process, a backwashing process, a regeneration process, an displacement process, a rinse process, a water refilling process, and a water flow waiting process. These respective processes are performed by controlling the opening/closing of the above respective valves 6 to 13 as shown in FIG. 2.

In the water passing process, raw water is supplied from the raw water inlet 22 to the upper water passage port 17 of the pressure tank 3 through the first water passage 14. The water passes through the ion exchange resin bed from the upper part of the pressure tank 3 to the lower part, to become treated water (herein, soft water). The treated water is led out from the lower water passage port 19 of the pressure tank 3 to the treated water outlet 23 through the inner pipe 18 and the second water passage 15.

The regeneration waiting process is a waiting process to the backwashing process, and the water flow waiting process is a waiting process to the water passing process. In each process after the regeneration waiting process, the raw water is fed to the second ion exchange apparatus 2 through the bypass passage 24.

In the backwashing process, raw water is supplied from the raw water inlet 22 to the lower water passage port 19 of the pressure tank 3 through the bypass passage 24, the second water passage 15, and the inner pipe 18. The water passes from the lower part of the pressure tank 3 to the upper part, while expanding the ion exchange resin bed. The drainage is led out from the upper water passage port 17 of the pressure tank 3 to the drain outlet 25 through the backwash drain passage 26.

In the regeneration process, driving water (raw water) is supplied from the driving water inlet 29 to the ejector 30 through the driving water passage 31. In the ejector 30, when water is jetted from the nozzle 35, regenerant in the regenerant tank 4 is sucked in the suction port 38 of the ejector 30 through the regenerant pipe 41 and the regenerant passage 39, and mixed with the driving water to be discharged. The regenerant is supplied to the upper water passage port 17 of the pressure tank 3 through the first regeneration passage 43, and is supplied to the lower water passage port 19 of the pressure tank 3 through the second regeneration passage 44 and the inner pipe 18. The regenerant from the upper water passage port 17 of the pressure tank 3 and the regenerant from the lower water passage port 19 circulate toward the central part in the vertical direction of the pressure tank 3 to regenerate the ion exchange resin bed. The drainage is led out from the central water passage port 21 of the pressure tank 3 to the drain outlet 25 through the outer pipe 20 and the regeneration drain passage 16. According to such split flow regeneration, the regeneration of the ion exchange resin bed can be stably attained while maintaining high regeneration efficiency.

The displacement process is different from the regeneration process in that the supply of the regenerant to the suction port 38 of the ejector 30 is stopped. Except for this, the displacement process is the same as the regeneration process. Regenerant that remains in the pressure tank 3 after the regeneration process is ejected in the displacement process.

In the rinse process, raw water is supplied from the raw water inlet 22 to the upper water passage port 17 of the pressure tank 3 through the first water passage 14. The water passes through the ion exchange resin bed from the upper part of the pressure tank 3 to the lower part, to rinses the ion exchange resin bed. The drainage is led out from the lower water passage port 19 of the pressure tank 3 to the drain outlet 25 through the inner pipe 18 and the rinse drain passage 27.

In the water refilling process, raw water is supplied from the driving water inlet 29 to the ejector 30 through the driving water passage 31. The water is supplied from the suction port 38 of the ejector 30 to the regenerant tank 4 through the regenerant passage 39 and the regenerant pipe 41. Thus, water can be supplied to the regenerant tank 4 in preparation for a next regeneration process.

Specific Configuration of Flow Passage Control Valve 1

Hereinafter, a specific configuration of the flow passage control valve 1 of this embodiment will be described.

Figure 3:
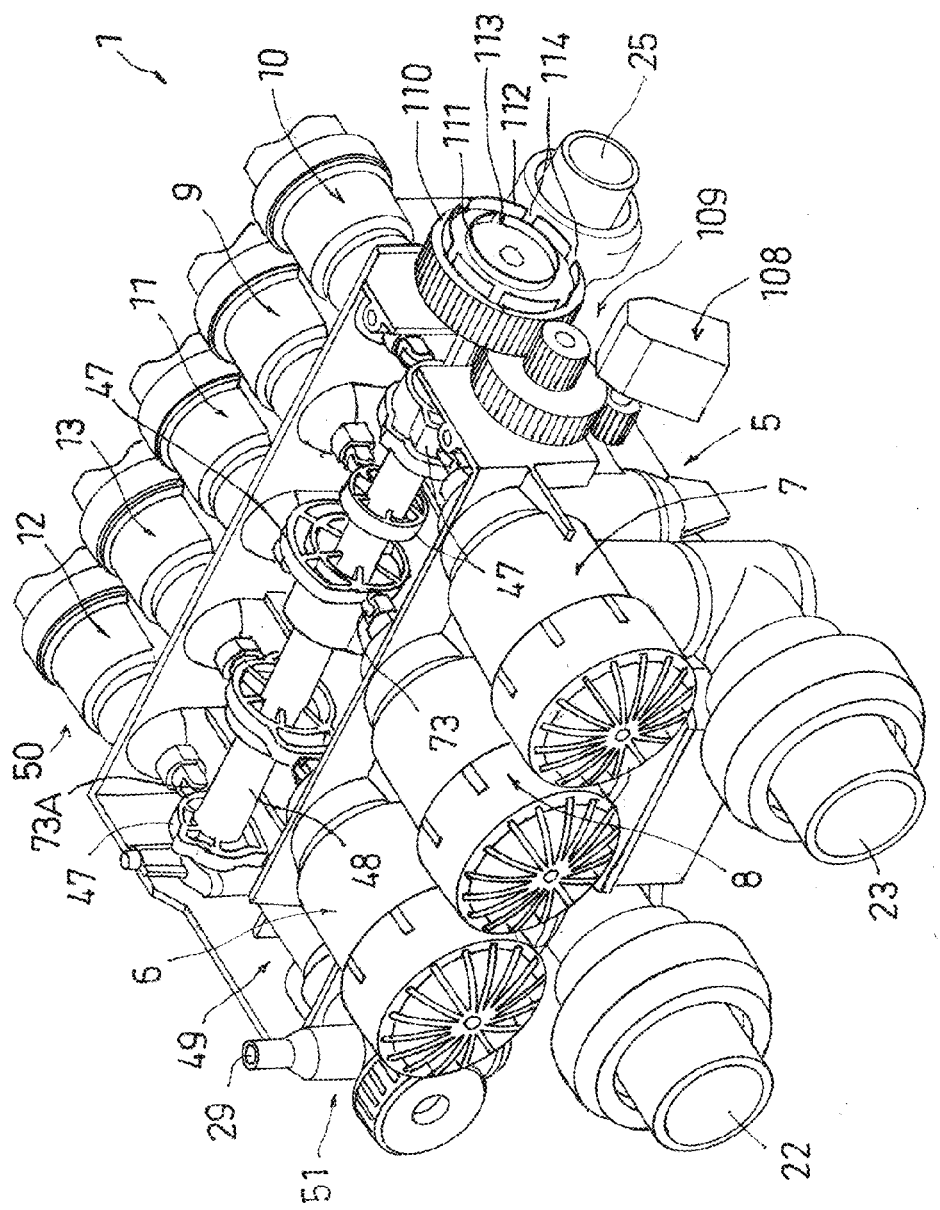
FIG. 3 is a schematic perspective view showing the flow passage control valve of Embodiment 1.

FIG. 3 is a schematic perspective view of the flow passage control valve 1 of this embodiment. The flow passage control valve 1 is configured by providing the respective valves 6 to 13, the ejector 30, and the like in the valve housing 5 formed with the respective flow passages 14, 15, 16, 24, 26, 27, 31, 39, 43 and 44. That is, in the valve housing 5, the respective flow passages 14, 15, 16, 24, 26, 27, 31, 39, 43 and 44 are formed, and the respective valves 6 to 13, the ejector 30 and the like are provided, so as to form a circuit shown in FIG. 1.

Cams 47 perform the opening/closing operation of the respective valves 6 to 13, and a camshaft 48 that rotates the cams 47 is provided at the central part in the front and rear direction of the upper part of the valve housing 5, along the right and left direction. The respective valves 6 to 13 are arranged so as to be divided front and rear into a first valve group 49 and a second valve group 50 with the camshaft 48 as a border therebetween. At this time, the regeneration valve 12 may be included in any of the first valve group 49 and the second valve group 50. In this embodiment, the regeneration valve 12 is included in the second valve group 50.

The first valve group 49 includes the first water passage valve 6, the second water passage valve 7, and the bypass valve 8. At this time, the bypass valve 8 is preferably arranged between the first water passage valve 6 and the second water passage valve 7. In FIG. 3, the first valve group 49 is arranged at the front of the valve housing 5, and the first water passage valve 6, the bypass valve 8, and the second water passage valve 7 are laterally arranged side by side in this order from the left. Additionally, an ejector housing part 51 is provided on the left of the first water passage valve 6.

The second valve group 50 includes the backwash drain valve 9, the rinse drain valve 10, the regeneration drain valve 11, the distribution valve 13, and the regeneration valve 12. At this time, the backwash drain valve 9 is preferably arranged adjacent to the rinse drain valve 10, and the regeneration drain valve 11 is preferably arranged adjacent to the valves. Additionally, the regeneration valve 12 is preferably arranged adjacent to the distribution valve 13. In FIG. 3, in the second valve group 50, the regeneration valve 12, the distribution valve 13, the regeneration drain valve 11, the backwash drain valve 9, and the rinse drain valve 10 are laterally arranged side by side in this order from the left.

In the valve housing 5, as the doorways of fluid, the raw water inlet 22, the treated water outlet 23, the drain outlet 25, the driving water inlet 29, and the regenerant port 40 are provided as described above.

The raw water inlet 22 and the treated water outlet 23 are preferably provided on the side of the first valve group 49. In this embodiment, the raw water inlet 22 is provided in the lower part of the first water passage valve 6, and the treated water outlet 23 is provided in the lower part of the second water passage valve 7. More specifically, a pipe that configures the end of the first water passage 14 is provided in the lower part of the first water passage valve 6 so as to extend forward, and a front end opening of the pipe is the raw water inlet 22. Additionally, a pipe that configures the end of the second water passage 15 is provided in the lower part of the second water passage valve 7 so as to extend forward, and a front end opening of the pipe is the treated water outlet 23.

The drain outlet 25 is preferably provided on the side of the second valve group 50. In this embodiment, the drain outlet 25 is provided on the lower parts of the regeneration drain valve 11, the backwash drain valve 9, and the rinse drain valve 10. More specifically, a pipe that collects the ends of the regeneration drain passage 16, the backwash drain passage 26, and the rinse drain passage 27 is provided so as to extend from near the lower parts of these valves 9 to 11 to the right, and a right end opening of the pipe is the drain outlet 25.

The driving water inlet 29 is preferably provided adjacent to the ejector 30. In this embodiment, the driving water inlet 29 is provided in the upper part of the ejector housing part 51. More specifically, a pipe that configures the end of the driving water passage 31 is provided in the upper part of the ejector housing part 51 so as to extend upward, and an end opening of the pipe is the driving water inlet 29.

Figure 9:
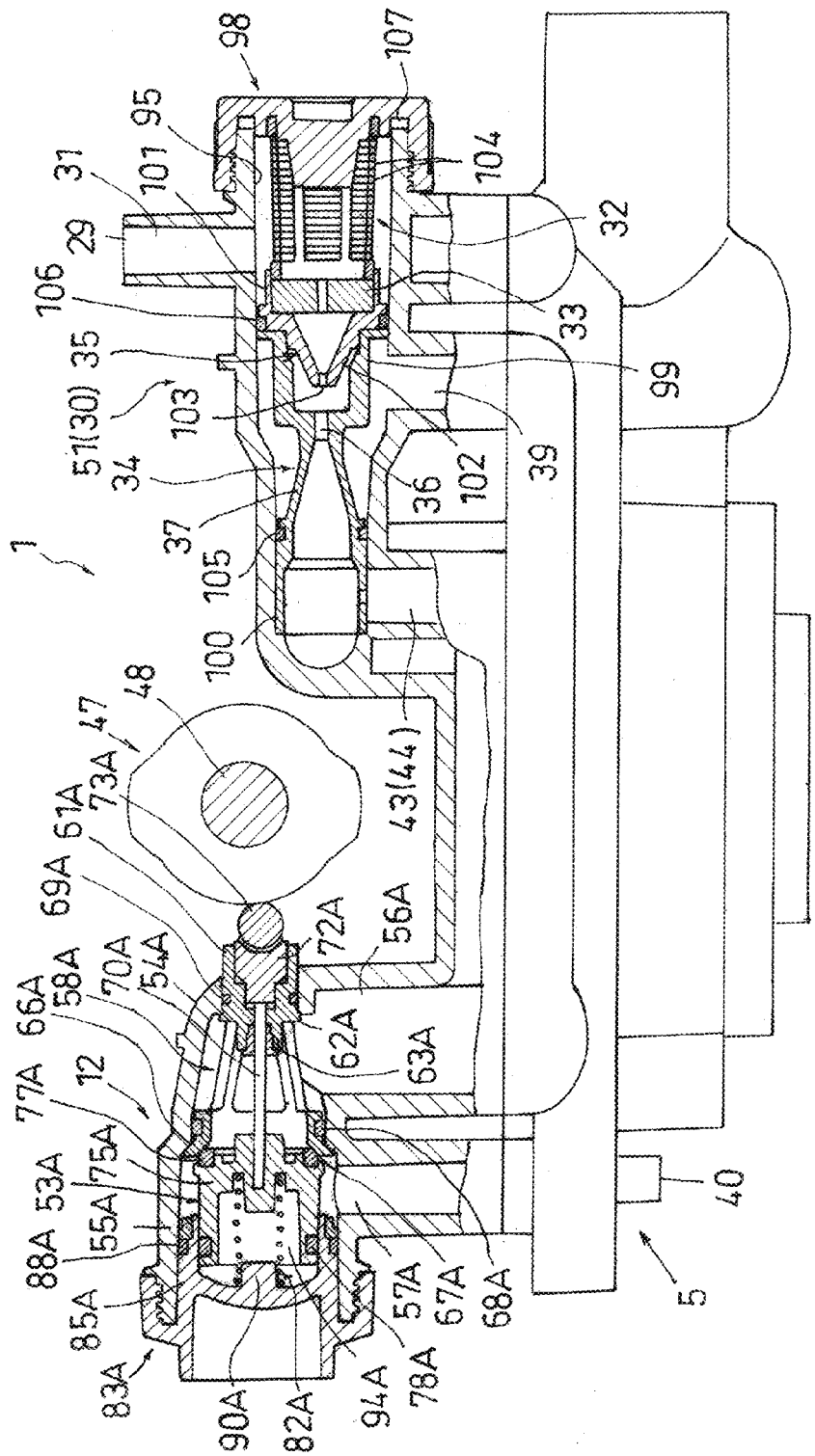
FIG. 9 is a schematic longitudinal sectional view of an assembled state of the ejector of the flow passage control valve of Embodiment 1, and the peripheral components therearound, and shows the ejector and the peripheral components along with a regeneration valve.

The regenerant port 40 is preferably provided adjacent to the regeneration valve 12. In this embodiment, the regenerant port 40 is provided in the lower part of the regeneration valve 12 (FIG. 9). More specifically, the regenerant port 40 is provided in the lower part of the regeneration valve 12, and the regenerant flowmeter 42 is provided in the regenerant port 40.

Figure 4:
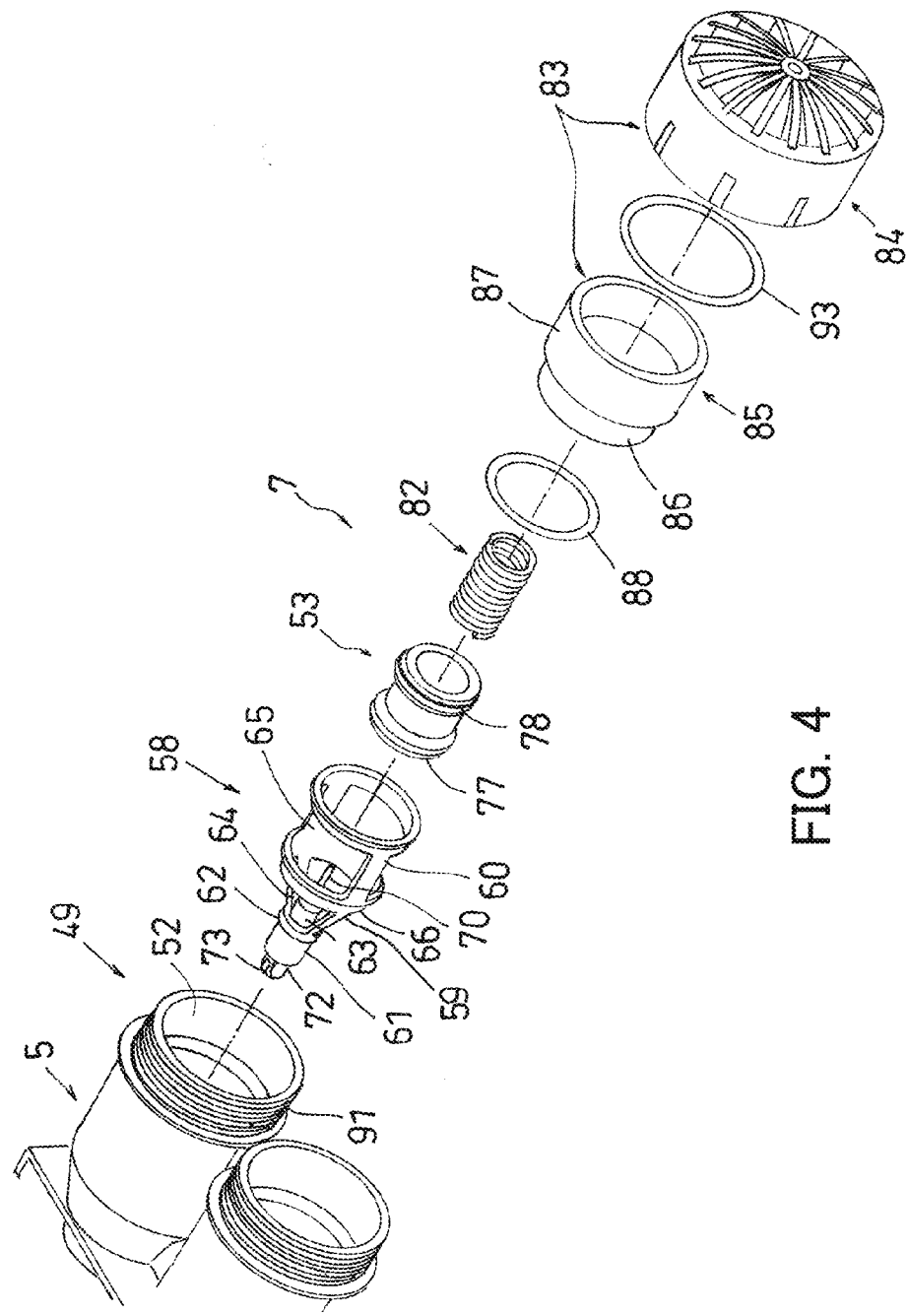
FIG. 4 is an exploded perspective view of a valve in a first valve group of the flow passage control valve of Embodiment 1.
Figure 5:
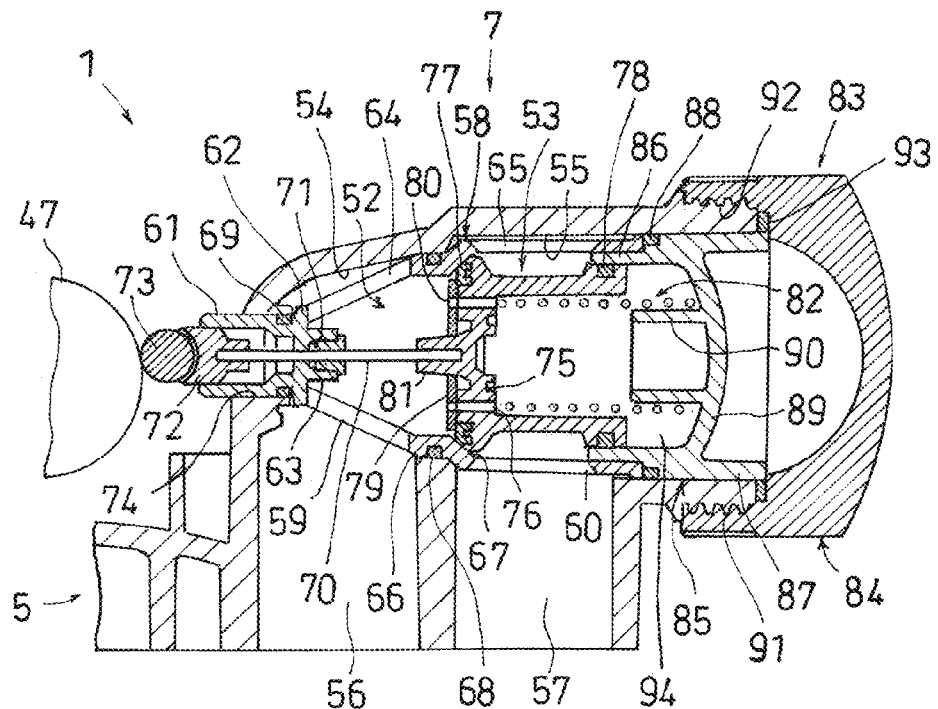
FIG. 5 is a schematic longitudinal sectional view of an assembled state of the valve in the first valve group of the flow passage control valve of Embodiment 1, and shows a valve closing state.
Figure 6:
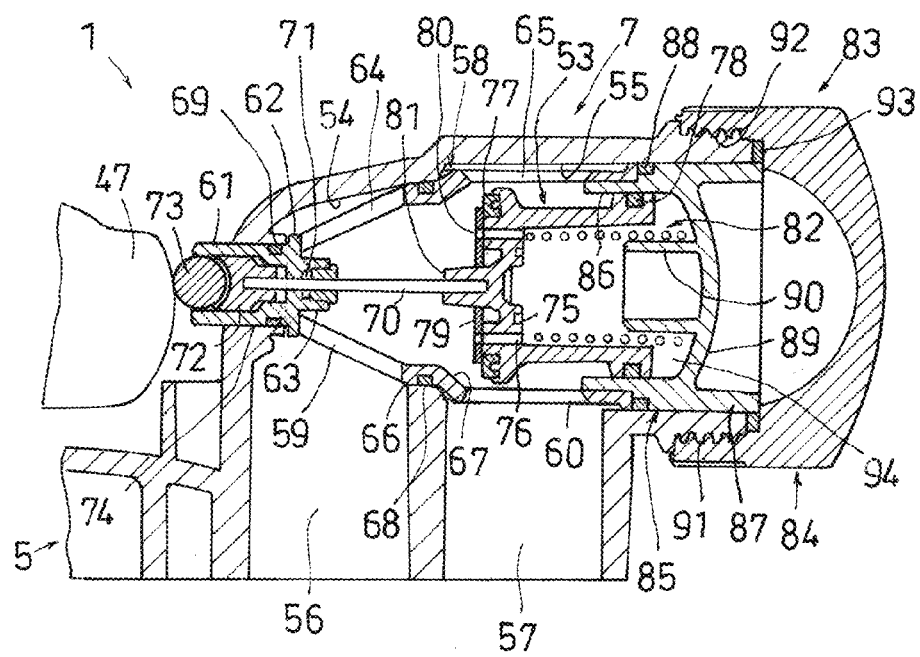
FIG. 6 is a schematic longitudinal sectional view of the assembled state of the valve in the first valve group of the flow passage control valve of Embodiment 1, and shows a valve opening state.
Figure 7:
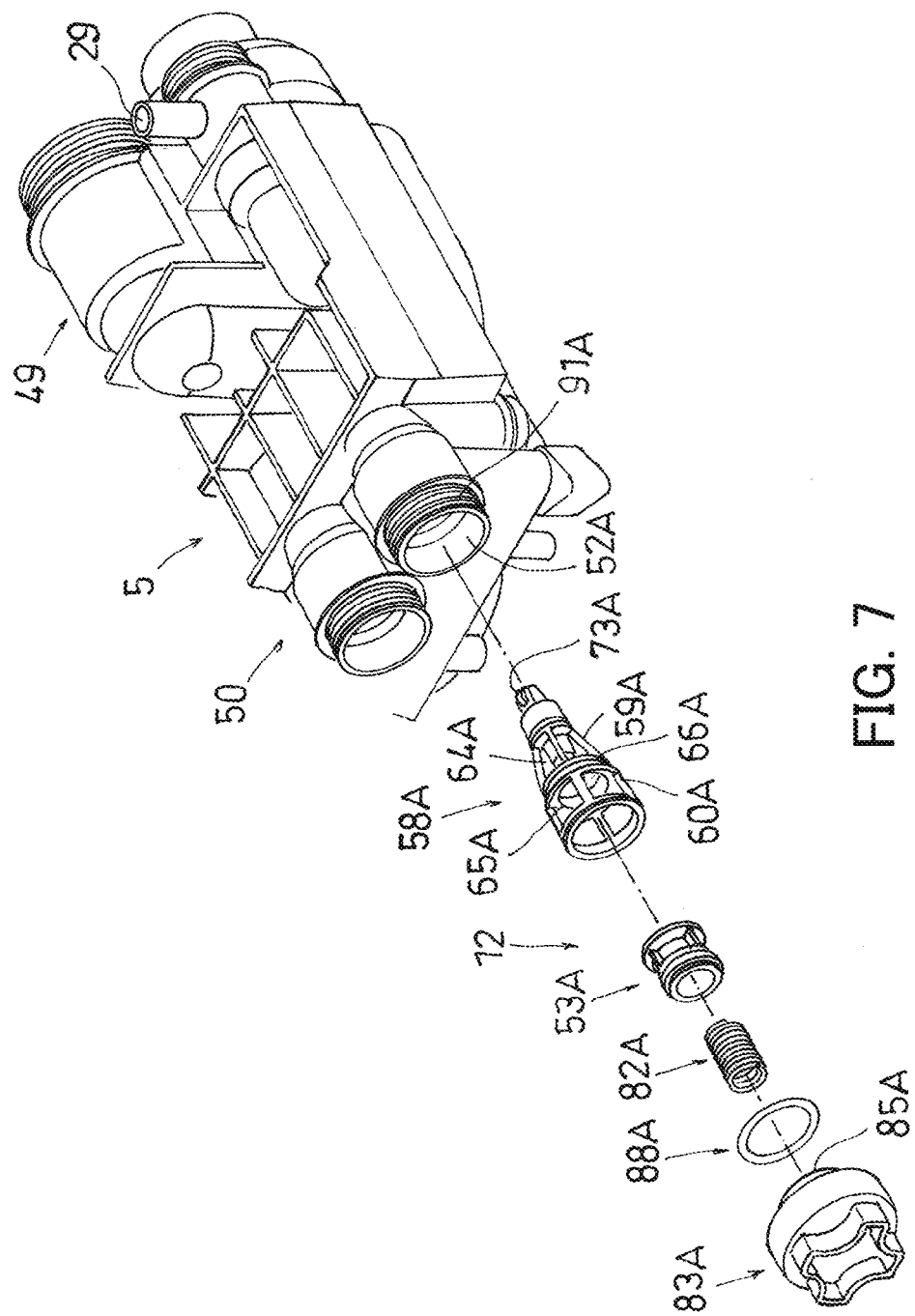
FIG. 7 is an exploded perspective view of a valve in a second valve group of the flow passage control valve of Embodiment 1, and shows a state as viewed from the rear of a valve housing.

FIG. 4 is an exploded perspective view of the valve in the first valve group 49. Although the second water passage valve 7 is shown herein, the first water passage valve 6 and the bypass valve 8 each have a similar configuration. Additionally, FIG. 5 and FIG. 6 each are a schematic longitudinal sectional view of an assembled state of the valve (7) in the first valve group 49. FIG. 5 shows a valve closing state, and FIG. 6 shows a valve opening state. Furthermore, FIG. 7 shows an exploded perspective view of the valve in the second valve group 50, and shows a state as viewed from the rear of the valve housing 5. Although the regeneration valve 12 is shown herein, the distribution valve 13, the regeneration drain valve 11, the backwash drain valve 9, and the rinse drain valve 10 each have a similar configuration. FIG. 9 shows a longitudinal sectional view of an assembled state of the regeneration valve 12.

In each of the valves 6 to 13 in the first valve group 49 and the second valve group 50, a valve piston 53 (53A) is retractably provided in a valve housing hole 52 (52A) formed in the valve housing 5. The valve housing hole 52 (52A) is provided horizontally so as to be opened to the outside in the front and rear direction of the valve housing 5. Specifically, the valve housing hole 52 of each of the valves 6 to 8 that configure the first valve group 49 is provided so as to be opened forward, and the valve housing hole 52A of each of the valves 9 to 13 that configure the second valve group 50 is provided so as to be opened rearward.

The respective valves (the first water passage valve 6, the second water passage valve 7, and the bypass valve 8) that configure the first valve group 49 have the same configuration. Specific description will be hereinafter made with reference to FIG. 4 to FIG. 6. The valve housing hole 52 is opened to the outside in the front and rear direction of the valve housing 5 as described above, a side close to the opening is referred to as a proximal end side, and a side opposite to this is referred to as a distal end side.

The valve housing hole 52 is a circular hole having a tapered distal end, and includes a truncated cone shaped part 54 on the distal end side and a cylindrical part 55 on the proximal end side. The valve housing hole 52 is formed with a first opening 56 and a second opening 57 that serve as the doorways of fluid to the valve housing hole 52, at axially separated positions. The first opening 56 is provided in the lower part of a peripheral side wall of the truncated cone shaped part 54, and the second opening 57 is provided in the lower part of a peripheral side wall of the cylindrical part 55.

With reference to FIG. 1, in the first water passage valve 6, the first opening 56 is communicated with the upper water passage port 17, and the second opening 57 is communicated with the raw water inlet 22. In the second water passage valve 7, the first opening 56 is communicated with the lower water passage port 19, and the second opening 57 is communicated with the treated water outlet 23. In the bypass valve 8, the first opening 56 is communicated with the treated water outlet 23, and the second opening 57 is communicated with the raw water inlet 22.

The valve housing hole 52 is mounted with a valve frame 58, and the valve frame 58 is retractably provided with the valve piston 53. The valve frame 58 is formed in a substantially cylindrical shape having a tapered distal end, and nearly corresponds to the shape of the valve housing hole 52. Specifically, the valve frame 58 includes a truncated cone shaped part 59 on the distal end side, and a cylindrical part 60 on the proximal end side. The distal end of the truncated cone shaped part 59 is formed with a small cylindrical part 61 that protrudes to the distal end side, and is opened to the distal end side. The proximal end of the small cylindrical part 61 is formed with a flange part 62, and a short cylinder 63 that protrudes to the proximal end side.

The truncated cone shaped part 59 and the cylindrical part 60 of the valve frame 58 are formed with large openings 64 and 65 in the peripheral side walls thereof. Consequently, in the valve frame 58, the truncated cone shaped part 59 and the cylindrical part 60 each remain in a frame shape. That is, the valve frame 58 is formed such that a connection part of the truncated cone shaped part 59 and the cylindrical part 60, the distal end of the truncated cone shaped part 59, and the proximal end of the cylindrical part 60 remain annularly, and are connected to each other by a plurality of ribs.

An annular part 66 that connects the truncated cone shaped part 59 and the cylindrical part 60 is formed in an inclined surface having an inner peripheral surface on the proximal end side, the diameter of which decreases to the distal end side, and this inclined surface functions as a valve seat part 67. In the outer peripheral part of the annular part 66, an annular groove is formed, and an O-ring 68 is mounted. Additionally, also in the outer peripheral part of the proximal end of the small cylindrical part 61, an annular groove is formed, and an O-ring 69 is mounted.

A valve shaft 70 is retractably provided along the axis of the valve frame 58 in the small cylindrical part 61 and the short cylinder 63. A clearance between the valve shaft 70 and the valve frame 58 is sealed by an annular packing 71 having a substantially V-shaped cross-section, which is provided in the short cylinder 63.

A roller guide 72 is provided in the distal end of the valve shaft 70, and a roller 73 is rotatably held by the roller guide 72. The roller guide 72 is fitted in the small cylindrical part 61 of the valve frame 58. An inner hole of the small cylindrical part 61 and the outer shape of the roller guide 72 are formed as predetermined, and therefore the roller guide 72 is retractable with respect to the small cylindrical part 61 along the axis of the valve frame 58, but is provided so as to be relatively unrotatabe with respect to the small cylindrical part 61.

The valve frame 58 is fitted in the valve housing hole 52. The distal end of the valve housing hole 52 is formed with a through hole 74, and the small cylindrical part 61 of the valve frame 58 is fitted in the through hole 74. At this time, the flange part 62 of the small cylindrical part 61 is fitted so as to be in contact with a wall surface around the through hole 74. Then, the clearance between the small cylindrical part 61 and the valve housing 5 is sealed by the O-ring 69 of the proximal end of the small cylindrical part 61. Additionally, the clearance between the annular part 66 and the valve housing 5 is sealed by the O-ring 68 of the annular part 66. Consequently, the first opening 56 is communicated with the second opening 57 only through an inner hole of the valve frame 58.

In the inner hole of the valve frame 58, the valve piston 53 is retractably provided. The valve piston 53 is formed in a cylindrical shape, and has a distal end formed with an end wall 75. This end wall 75 is formed with a plurality of communication holes 76. These communication holes 76 are provided at equal intervals in the peripheral direction of the valve piston 53, and penetrate the end wall 75 along the axial direction of the valve piston 53.

The valve piston 53 is provided with a first seal material 77 and a second seal material 78 at axially separated position. The first seal material 77 is formed in an annular shape, and is provided in the distal end of the valve piston 53. Specifically, the first seal material 77 is mounted on the distal end surface of the valve piston 53, and fixed by a disk-shaped pressing plate 79. The pressing plate 79 is fixed to the end wall 75 by a screw (not shown), has a diameter larger than the inner diameter of the first seal material 77, and smaller than the outer diameter of the first seal material 77. Therefore, the first seal material 77 is exposed to the outer peripheral part of the pressing plate 79 while being mounted with the pressing plate 79. On the other hand, the second seal material 78 is an annular X-ring with an X-shaped cross-section, and is mounted on the annular groove formed in the outer peripheral surface of the proximal end of the valve piston 53.

The pressing plate 79 is formed with through holes 80 that correspond to the communication holes 76. Additionally, a hole is formed at the center of the pressing plate 79, and a protrusion distal end 81 of the valve piston 53 passes through this hole. In the protrusion distal end 81 of the valve piston 53, the bearing hole is formed so as to be opened only to the distal end side, and the end of the valve shaft 70 is fitted in this bearing hole.

The valve frame 58, the valve piston 53, and a spring 82 are sequentially incorporated in the valve housing hole 52, and the opening is sealed by a valve cap 83. At this time, the valve cap 83 is detachably screwed and mounted in the proximal end of the valve housing hole 52.

The valve cap 83 is configured by combining a cap body 84 and a cylindrical material 85 in this embodiment. The cylindrical material 85 is formed in a stepped cylindrical shape, and has a small diameter part 86 on the distal end side, which has an outer diameter corresponding to the inner diameter of the cylindrical part 60 of the valve frame 58, and a large diameter part 87 on the proximal end side, which has an outer diameter corresponding to the inner diameter of the cylindrical part 55 of the valve housing hole 52. Accordingly, the small diameter part 86 on the distal end side of the cylindrical material 85 is fitted to the proximal end of the valve frame 58, and the large diameter part 87 on the proximal end side of the cylindrical material 85 is fitted to the proximal end of the valve housing hole 52. At this time, an O-ring 88 is arranged between the proximal end of the valve frame 58 and the stepped part of the cylindrical material 85, and seals a clearance between the valve frame 58 and the cylindrical material 85, and a clearance between the valve frame 58 and the valve housing 5.

In a hollow hole of the cylindrical material 85, a partition 89 is formed in the axial middle part, and the hollow hole is closed. At the central part of a partition 89, a cylindrical spring holder 90 is provided so as to protrude to the distal end side. The spring 82 has a proximal end that is fitted to the spring holder 90, and a distal end that is fitted into an inner hole of the valve piston 53.

In a state where the valve frame 58, the valve piston 53, the spring 82, and the cylindrical material 85 are incorporated in the valve housing hole 52, the cap body 84 is mounted on the proximal end of the valve housing hole 52. That is, while the outer peripheral surface of the proximal end of the cylindrical part 55 of the valve housing hole 52 is a screw part 91, the cap body 84 is formed in a substantially cylindrical shape that is opened only to the distal end side, and formed with a screw hole 92 in the inner peripheral surface. Accordingly, the cap body 84 can be detachably mounted on the screw part 91 of the valve housing hole 52. When the cap body 84 is mounted on the proximal end of the valve housing hole 52, a clearance between the valve housing 5 and the valve cap 83 is sealed by an O-ring 93.

In the valve cap 83, the cap body 84 and the cylindrical material 85 are configured as separate bodies in order to increase strength. However, in a case where the diameter of the valve housing hole is small, both may be integrally formed. In each of the valves 9 to 13 in the second valve group 50, which will be described later, the cap body 84 and the cylindrical material 85 are integrally formed.

In a state where the valve frame 58, the valve piston 53, the spring 82, and the like are assembled to the valve housing hole 52, the first opening 56 and the second opening 57 are communicated with each other only through the inner hole of the valve frame 58, as described above. Additionally, the valve piston 53 is urged to the distal end side by the urging force of the spring 82. Then, as shown in FIG. 5, in a state where the first seal material 77 of the valve piston 53 is pressed against the valve seat part 67 of the valve frame 58, the communication between the first opening 56 and the second opening 57 is blocked. On the contrary, as shown in FIG. 6, when the valve shaft 70 is pressed in toward the proximal end side against the urging force of the spring 82, and the valve piston 53 is pressed back to the proximal end side, the communication between the first opening 56 and the second opening 57 is secured.

The proximal end of the valve piston 53 is fitted in the cylindrical part of the valve cap 83 (cylindrical material 85 in this embodiment), and slides inside the cylindrical material 85. A chamber 94 is formed between the valve piston 53 and the cylindrical material 85 of the valve cap 83. This chamber 94 is communicated with the side of the first opening 56 through the communication holes 76 of the valve piston 53. Accordingly, in the valve closing state, the chamber 94 is communicated with the first opening 56 on the distal end side through the communication holes 76 of the valve piston 53, thereby balancing a part of or all of fluid pressure in the valve opening direction and a part of or all of fluid pressure in the valve closing direction, which are applied to the valve piston 53. Consequently, even in a case where the first opening 56 is used as a fluid inlet side (high pressure side), the urging force of the spring 82 does not need to be increased, and it is possible to reduce driving force required for valve opening.

Each of the valves (the regeneration valve 12, the distribution valve 13, the regeneration drain valve 11, the backwash drain valve 9, and the rinse drain valve 10) that configure the second valve group 50 is smaller than each of the valves 6 to 8 that configure the first valve group 49, but has basically similar configuration to each of the valves 6 to 8 that configure the first valve group 49 (FIG. 7 and FIG. 9). Therefore, difference between both valves will be hereinafter mainly described, and corresponding parts are followed by the same reference numerals. However, in order to simply distinguish a configuration of each of the valves 6 to 8 in the first valve group from a configuration of each of the valves 9 to 13 in the second valve group 50, the latter configuration is followed by a subscript "A". For example, while the valve piston in the first valve group 49 is denoted by "valve piston 53", the valve piston in the second valve group 50 is denoted by "valve piston 53A".

A valve housing hole 52A of each of the valves that configure the second valve group 50 is formed to be opened rearward. Therefore, in each valve housing hole 52A, a truncated cone shaped part 54A is arranged at the front, a cylindrical part 55A is arranged at the rear. Additionally, a first opening 56A is formed in the lower part of the truncated cone shaped part 54A, and a second opening 57A is formed in the lower part of the cylindrical part 55A.

With reference to FIG. 1, in the regeneration valve 12, the first opening 56A is communicated with the suction port 38 of the ejector 30, and the second opening 57A is communicated with the regenerant port 40. In the distribution valve 13, the first opening 56A is communicated with an outlet the ejector 30, and the second opening 57A is communicated with the lower water passage port 19. In the regeneration drain valve 11, the first opening 56A is communicated with the central water passage port 21, and the second opening 57A is communicated with the drain outlet 25. In the backwash drain valve 9, the first opening 56A is communicated with the upper water passage port 17, and the second opening 57A is communicated with the drain outlet 25. In the rinse drain valve 10, the first opening 56A is communicated with the lower water passage port 19, and the second opening 57A is communicated with the drain outlet 25.

In the case of the first valve group 49, the valve cap 83 is configured from the cap body 84 and the cylindrical material 85. In the case of the second valve group 50, a valve cap 83A is configured by integrally forming a cap body 84 and a cylindrical material 85. That is, as shown in FIG. 9, the valve cap 83A is previously fixed to a cylinder 85A at the proximal end of the cylinder 85A, thereby forming a single component.

Each valve in the first valve group 49 is slightly different from each valve in the second valve group 50 in design of the valve cap 83A and a valve piston 53A, and the like in addition to the above, but there is no basic difference between both, and therefore description will be omitted.

Figure 8:
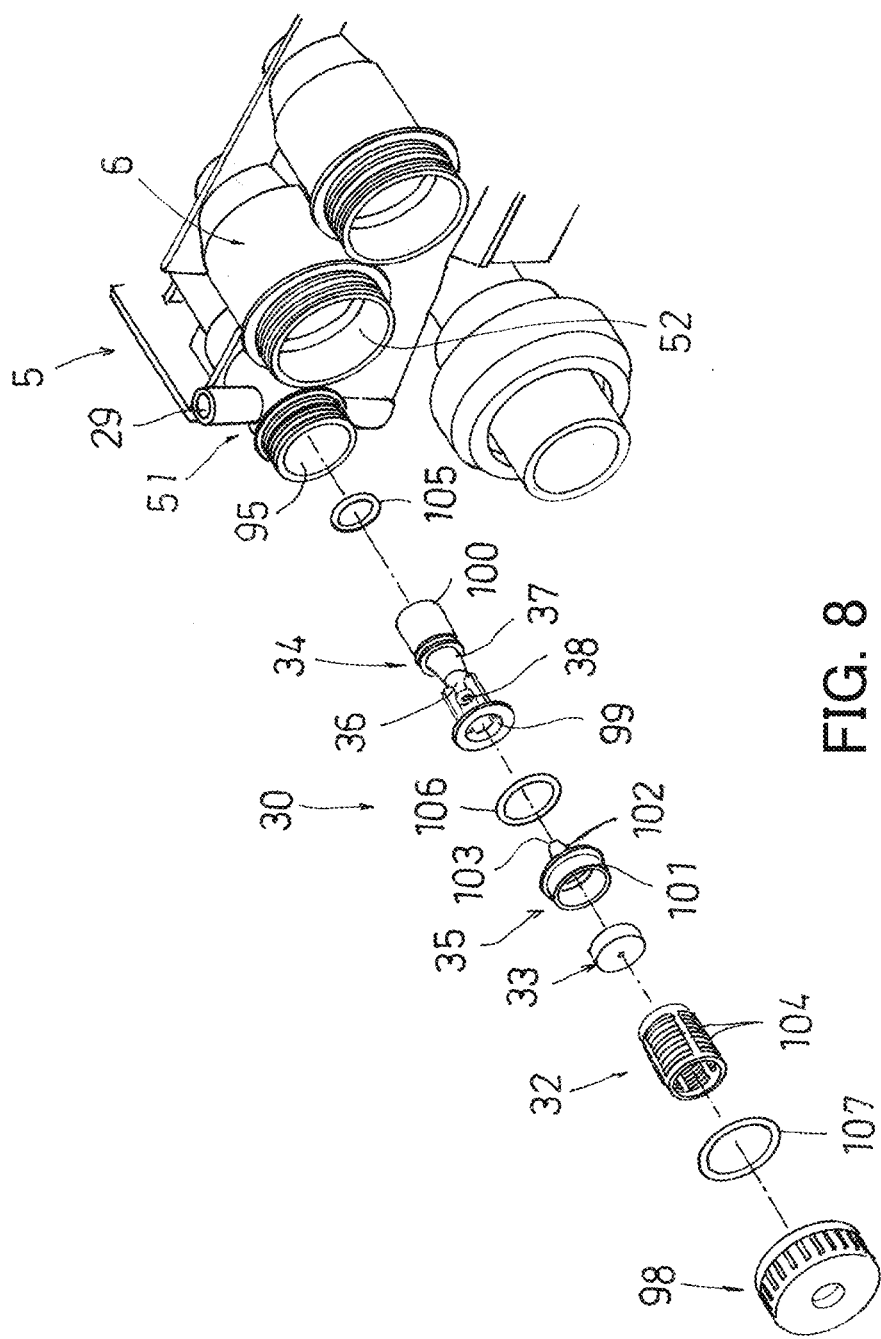
FIG. 8 is an exploded perspective view of an ejector of the flow passage control valve of Embodiment 1, and peripheral components therearound.

FIG. 8 is an exploded perspective view of the ejector 30 of and peripheral components therearound. FIG. 9 is a schematic longitudinal sectional view of an assembled state of the ejector 30 and the peripheral components therearound, and shows the ejector 30 and the peripheral components along with the regeneration valve 12.

The ejector housing part 51 is provided adjacent to the first water passage valve 6, and includes an ejector housing hole 95 that is opened to the outside in the front and rear direction of the valve housing 5, in parallel with the valve housing hole 52 of the first water passage valve 6. The ejector body 34, the nozzle 35, the constant flow valve 33, and the strainer 32 are sequentially incorporated in the ejector housing hole 95, and an opening is sealed by a lid material 98. At this time, the lid material 98 is detachably screwed and mounted in the proximal end of the ejector housing hole 95.

The ejector body 34 includes a first cylindrical part 99 that is opened to the proximal end side, the diffuser part 37 having a diameter which increases from the central part of a distal end wall of the first cylindrical part 99 to the distal end side, and a second cylindrical part 100 that extends from the distal end of the diffuser part 37 to the distal end side. The first cylindrical part 99 is formed with the suction port (FIG. 8) on the peripheral side wall, and is formed with the throat part 36 configured from a small hole along the axial direction at the center of the distal end wall. This throat part 36 communicates the first cylindrical part 99 with the diffuser part 37.

The nozzle 35 is formed in a cylindrical shape having a tapered conical distal end, and includes a cylindrical part 101 and a conical part 102 in the proximal end and the distal end, respectively. A nozzle hole 103 is formed in the distal end of the conical part 102. The constant flow valve 33 and the distal end of the strainer 32 are fitted in a hollow hole of the cylindrical part 101.

The constant flow valve 33 is a rubber orifice formed with a through hole in the central part of a disk. On the other hand, the strainer 32 is cylindrical, and is formed with a large number of slits 104 in the peripheral side wall.

The ejector housing hole 95 is opened to the proximal end side, and incorporates the ejector body 34, the nozzle 35, the constant flow valve 33, and the strainer 32 in order, and an opening is sealed by the lid material 98. At this time, a clearance between the second cylindrical part 100 of the ejector body 34 and the ejector housing hole 95 of the valve housing 5 is sealed by an O-ring 105. Additionally, a clearance between the ejector body 34 and the nozzle 35, and a clearance between the ejector body 34 and the ejector housing hole 95, a clearance between the nozzle 35 and the ejector housing hole 95 are sealed by an O-ring 106. Furthermore, at the proximal end of the ejector housing hole 95, a clearance between the valve housing 5 and the lid material 98 is sealed by an O-ring 107.

In a state where the ejector 30 (34, 35) and the like are assembled to the ejector housing hole 95, the driving water passage 31 is opened at a position corresponding to the strainer 32, and the regenerant passage 39 leading from the regeneration valve 12 is opened at a position corresponding to the suction port 38 of the ejector body 34, as shown in FIG. 9. Furthermore, as described in FIG. 1, the first regeneration passage 43 and the second regeneration passage 44 are provided in the distal end of the ejector body 34 so as to be branched.

Since the flow passage control valve is configured as described above, in the regeneration process, when water is supplied from the driving water inlet 29, the water enters inside from the outer periphery of the strainer 32 to be jetted from the nozzle 35 to the distal end side of the ejector 30. With this, regenerant is sucked from the regenerant port 40 in the suction port 38, and mixed water of the regenerant and driving water is discharged from the ejector 30. Then, the mixed water is branched into the first regeneration passage 43 and the second regeneration passage 44, to be supplied to the pressure tank 3.

The opening/closing of respective valves 6 to 13 in the first valve group 49 and the second valve group 50 is operated by the cams 47. As shown in FIG. 3, the camshaft 48 is provided between the first valve group 49 and the second valve group 50 along the right and left direction, and the cams 47 are provided in the camshaft 48 to correspond to the respective valves 6 to 13.

The outer peripheral surfaces of each cam 47 is a contact part with the roller 73 (73A) provided in the valve shaft 70 (70A). The rotation axis of each roller 73 (73A) is arranged along the right and left direction, and the outer peripheral surface of each roller 73 (73A) comes into contact with the outer peripheral surface of the cam 47. Additionally, each roller 73 (73A) is urged to the outer peripheral surface of the cam 47 by the spring 82 (82A). Accordingly, when each cam 47 rotates, the valve shaft 70 (70A) advances and retracts with respect to the valve housing hole 52 (52A) while the roller 73 (73A) rotates.

When each cam 47 presses the valve shaft 70 (70A) to the outside in the front and rear direction of the valve housing 5 with the rotation of the camshaft 48, the valve piston 53 (53A) is separated from the valve seat part 67 (67A), thereby resulting in a valve opening state (FIG. 6). On the contrary, when the pressing of the valve shaft 70 (70A) is released with the rotation of the camshaft 48, the valve piston 53 (53A) moves to the inside in the front and rear direction of the valve housing 5 by the urging force of the spring 82 (82A), thereby resulting in a valve closing state (FIG. 5).

The shapes of the cams 47 corresponding to the respective valves 6 to 13 are changed, thereby enabling the control of the opening/closing states as shown in FIG. 2. The rotation of the cams 47 is performed by rotating the camshaft 48 with a motor 108. Specifically, when the motor 108 is rotated, the rotating force is transmitted to the camshaft 48 through a speed reducing gear train 109, so that the cams 47 can be rotated. The cams 47 are intermittently rotated in each process.

On the side surface of a cam gear 110 that configures the speed reducing gear train 109 and is provided in the end of the camshaft 48, an inner cylinder 111 and an outer cylinder 112 are concentrically formed so as to short-cylindrically protrude. The inner cylinder 111 is formed with a notch 113 for origin detection at a single place in the peripheral direction, and the outer cylinder 112 is formed with notches 114 for process detection corresponding to the respective process positions. Each of the notches 113 and 114 of the inner cylinder 111 and the outer cylinder 112 is readable by a photo sensor (not shown) such as a photo interrupter. Accordingly, the origin positions and the present positions of the cams 47 (i.e., which process is being performed) can be confirmed by the sensor. Additionally, an instruction plate (not shown) for the process position may be provided in the axial end of the cam gear 110 in order to enable visual confirmation of such a process position.

According to this embodiment, the valves for a water passing system, namely the first water passage valve 6, the second water passage valve 7, and the bypass valve 8 are arranged in the first valve group 49, and the valves for a regeneration system, namely the regeneration valve 12, the distribution valve 13, the regeneration drain valve 11, the backwash drain valve 9, and the rinse drain valve 10 are arranged in the second valve group 50. The valves are divided into the water passing system and the regeneration system, so that a flow passage in each process is easily arranged. Additionally, the number of the valves in the first valve group 49 is smaller than the number of the valves in the second valve group 50, and therefore even when a valve of which diameter is relatively large is used as the water passage valve 6 or 7 or the bypass valve 8, the whole of the flow passage control valve 1 is compactly housed. Consequently, the diameter of the water passing system is increased, so that a large water flow capacity can be provided.

The bypass valve 8 is arranged between the first water passage valve 6 and the second water passage valve 7, so that the bypass passage 24 can be easily arranged between the first water passage 14 and the second water passage 15. In addition, the raw water inlet 22 and the treated water outlet 23 are provided on the side of the first valve group 49, so that the valves for a water passing system can be completely collected.

On the other hand, the backwash drain valve 9, the rinse drain valve 10, and the regeneration drain valve 11 are collected, so that a flow passage for a drainage system is easily arranged. In addition, the drain outlet 25 is provided on the side of the second valve group 50, so that the valves for a regeneration system can be completely collected. Additionally, the regeneration valve 12 and the distribution valve 13 are collected, so that the flow passages for regenerant are easily arranged.

In each of the valves 6 to 13, the chamber 94 (94A) is formed in the proximal end of the valve housing hole 52 (52A) in the valve closing state, and is communicated with the first opening 56 (56A) on the distal end side through the communication holes 76 (76A) of the valve piston 53 (53A). Consequently, it is possible to balance a part of or all of fluid pressure in the valve opening direction and a part of or all of fluid pressure in the valve closing direction, which are applied to the valve piston 53 (53A).

The valve frame 58 (58A), the valve piston 53 (53A), and the spring 82 (82A) are sequentially incorporated in the valve housing hole 52 (52A), and the opening is sealed by the valve cap 83 (83A), and therefore assembly and maintenance is facilitated. In addition, the valve frame 58 (58A) is provided in the valve housing hole 52 (52A), and is retractably provided with the valve piston 53 (53A), and therefore it is possible to reduce the sliding area of the valve piston 53 (53A). Moreover, the large openings 64 (64A) and 65 (65A) are formed in the peripheral side wall of the valve frame 58 (58A), and therefore it is possible to secure a water flow passage to reduce a pressure loss.

Furthermore, the ejector body 34, the nozzle 35, the constant flow valve 33, and the strainer 32 are incorporated in the ejector housing hole 95, and the opening is sealed by the lid material 98, and therefore the assembly and the maintenance of a regenerant introduction mechanism are facilitated.

Embodiment 2

Figure 10:
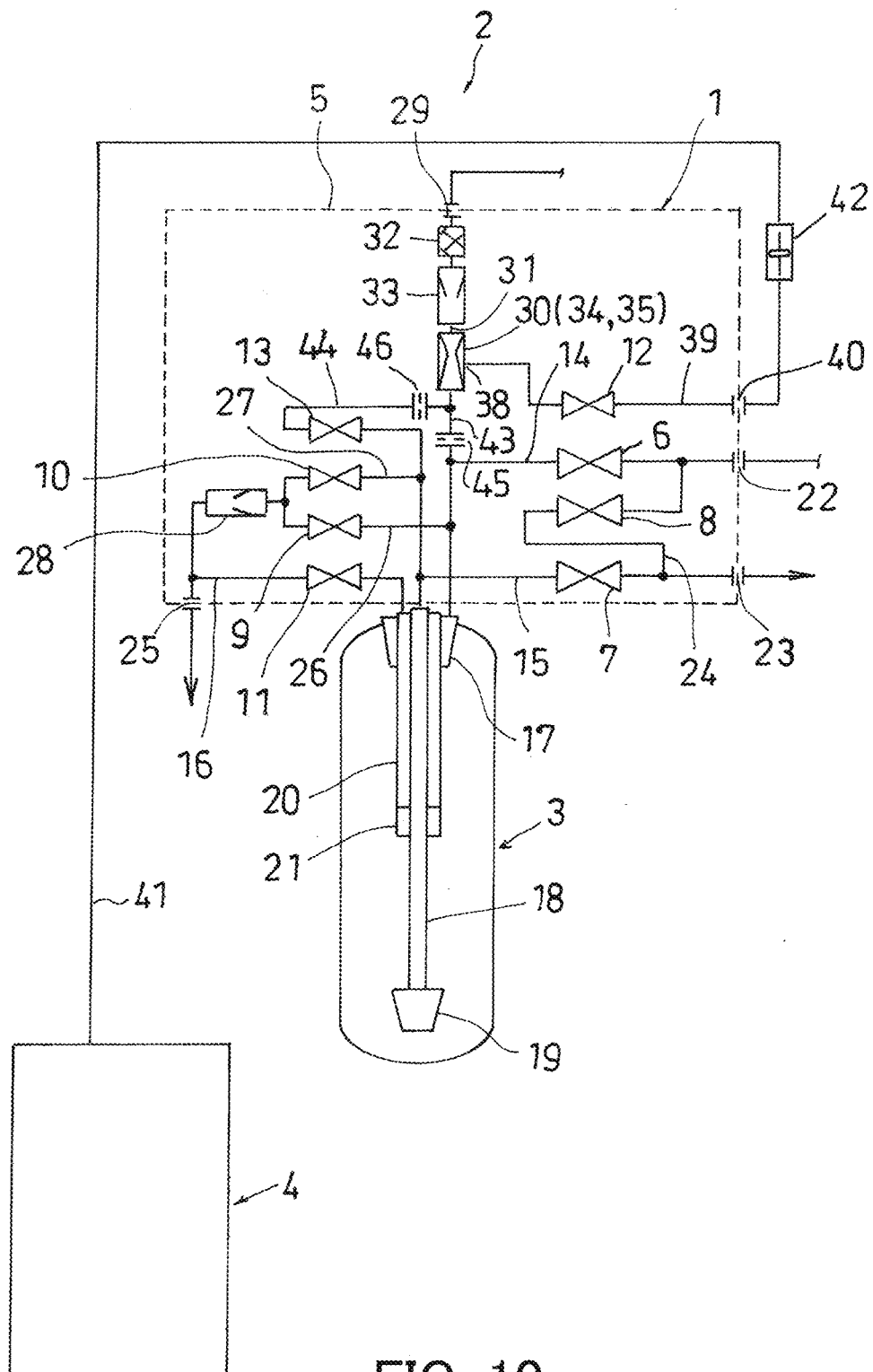
FIG. 10 is a schematic diagram showing an example of an ion exchange apparatus including a flow passage control valve of Embodiment 2 of the present invention.
Figure 11:
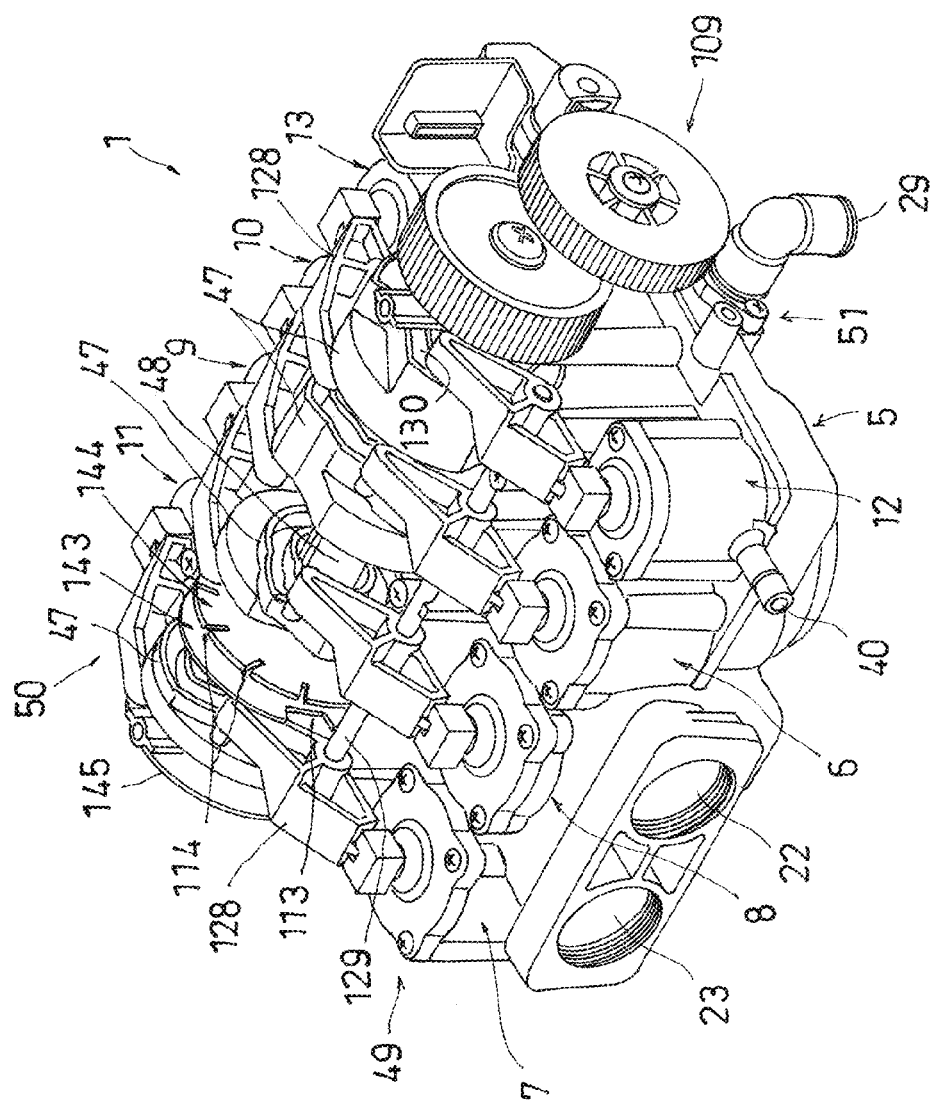
FIG. 11 is a schematic perspective view showing the flow passage control valve of Embodiment 2.

FIG. 10 is a schematic diagram showing an example of an ion exchange apparatus 2 including a flow passage control valve 1 of Embodiment 2 of the present invention. Additionally, FIG. 11 is a schematic perspective view of the flow passage control valve 1 of Embodiment 2.

The flow passage control valve 1 of Embodiment 2 is smaller than the flow passage control valve of Embodiment 1 described above, and is partially different in a configuration, but basically similar to that of Embodiment 1. Therefore, difference between both will be hereinafter mainly described, and corresponding parts are followed by the same reference numerals.

Also in Embodiment 2, respective valves 6 to 13 are arranged so as to be divided front and rear into a first valve group 49 and a second valve group 50 with a camshaft 48 as a border therebetween. At this time, the regeneration valve 12 may be included in any of the first valve group 49 and the second valve group 50. In this embodiment, the regeneration valve 12 is included in the first valve group 49.

The first valve group 49 includes the first water passage valve 6, the second water passage valve 7, and the bypass valve 8, and the regeneration valve 12. At this time, the bypass valve 8 is preferably arranged between the first water passage valve 6 and the second water passage valve 7. In FIG. 11, the first valve group 49 is arranged at the front of a valve housing 5, and the second water passage valve 7, the bypass valve 8, and the first water passage valve 6, and the regeneration valve 12 are laterally arranged side by side in this order from the left.

The second valve group 50 includes the backwash drain valve 9, the rinse drain valve 10, the regeneration drain valve 11, and the distribution valve 13. At this time, the backwash drain valve 9 is preferably arranged adjacent to the rinse drain valve 10, and the regeneration drain valve 11 is preferably arranged adjacent to the valves. In FIG. 11, in the second valve group 50, the regeneration drain valve 11, the backwash drain valve 9, the rinse drain valve 10, and the distribution valve 13 are laterally arranged side by side in this order from the left. Additionally, the regeneration valve 12 in the first valve group 49 and the distribution valve 13 in the second valve group 50 are arranged so as to face each other in the front and rear direction.

In the valve housing 5, as described above, a raw water inlet 22, a treated water outlet 23, a drain outlet 25, a driving water inlet 29, and a regenerant port 40 are provided as the doorways of fluid.

The raw water inlet 22 and the treated water outlet 23 are preferably provided on the side of the first valve group 49. In this embodiment, the raw water inlet 22 is provided so as to be opened forward at the intermediate part between the first water passage valve 6 and the bypass valve 8, and the treated water outlet 23 is provided at the intermediate part between the second water passage valve 7 and the bypass valve 8 so as to be opened forward. More specifically, the end of the first water passage 14 is provided at the intermediate part between the bypass valve 8 and the first water passage valve 6 of the valve housing 5 so as to extend forward, and a front end opening thereof is the raw water inlet 22. Additionally, the end of the second water passage 15 is provided at the intermediate part between the second water passage valve 7 and the bypass valve 8 of the valve housing 5 so as to extend forward, and a front end opening thereof is the treated water outlet 23.

Figure 12:
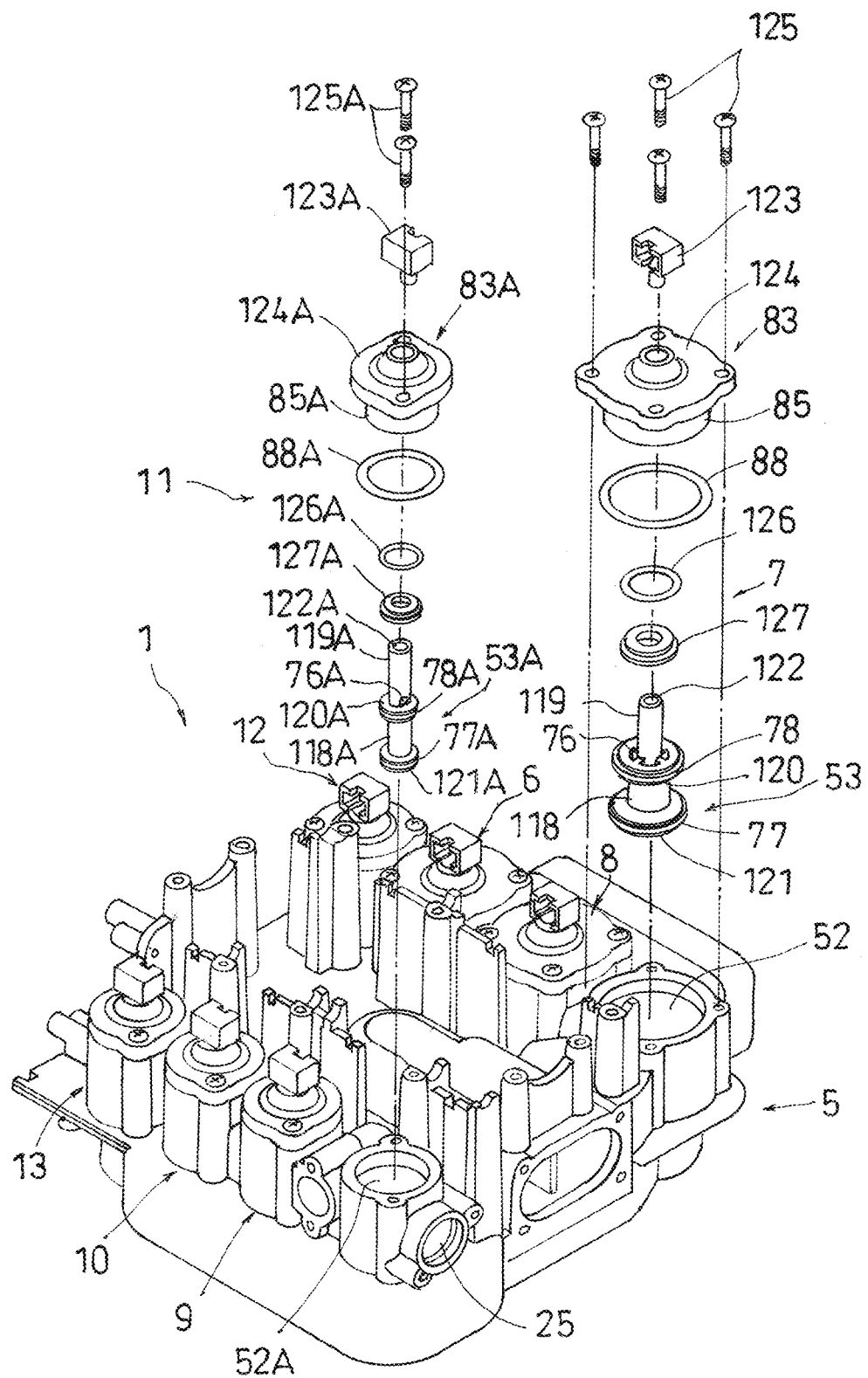
FIG. 12 is an exploded perspective view of valves in a first valve group and a second valve group of the flow passage control valve of Embodiment 2, and shows a state as viewed from the rear of a valve housing.

The drain outlet 25 is preferably provided on the side of the second valve group 50. In this embodiment, the drain outlet 25 is provided in the side part of the regeneration drain valve 11 (FIG. 12). More specifically, a pipe that collects the ends of the regeneration drain passage 16, the backwash drain passage 26, and the rinse drain passage 27 is provided so as to extend from the side part of the regeneration drain valve 11, and an end opening of the pipe is the drain outlet 25.

The driving water inlet 29 is preferably provided adjacent to an ejector 30. In this embodiment, in FIG. 11, the ejector 30 is housed in the right lower part of the central part in the front and rear direction of the valve housing 5, and the driving water inlet 29 is provided on the right surface thereof. More specifically, a pipe that configures the end of the driving water passage 31 is provided in the side part of the ejector housing part 51 so as to extend to the right and thereafter extend downward, and an end opening of the pipe is the driving water inlet 29.

The regenerant port 40 is preferably provided adjacent to the regeneration valve 12. In this embodiment, the regenerant port 40 is provided in the front part of the regeneration valve 12. More specifically, the regenerant port 40 is provided in the front part of the regeneration valve 12, and a regenerant flowmeter 42 is provided in the regenerant port 40 (FIG. 15).

FIG. 12 is an exploded perspective view of the valves 6 to 13 in the first valve group 49 and the second valve group 50, and shows a state as viewed from the rear of the valve housing 5. Although the second water passage valve 7 in the first valve group 49 is exploded to be shown herein, the first water passage valve 6 and the bypass valve 8 each have a similar configuration. Additionally, although the regeneration drain valve 11 in the second valve group 50 is exploded to be shown herein, the backwash drain valve 9, the rinse drain valve 10, and the distribution valve 13 each have a similar configuration. Furthermore, the regeneration valve 12 in the first valve group 49 has a similar configuration. That is, in this embodiment, the regeneration valve 12 is included in the first valve group 49, but have a configuration that is equal to that of each of the valves 9, 10, 11 and 13 in the second valve group 50.

Figure 13:
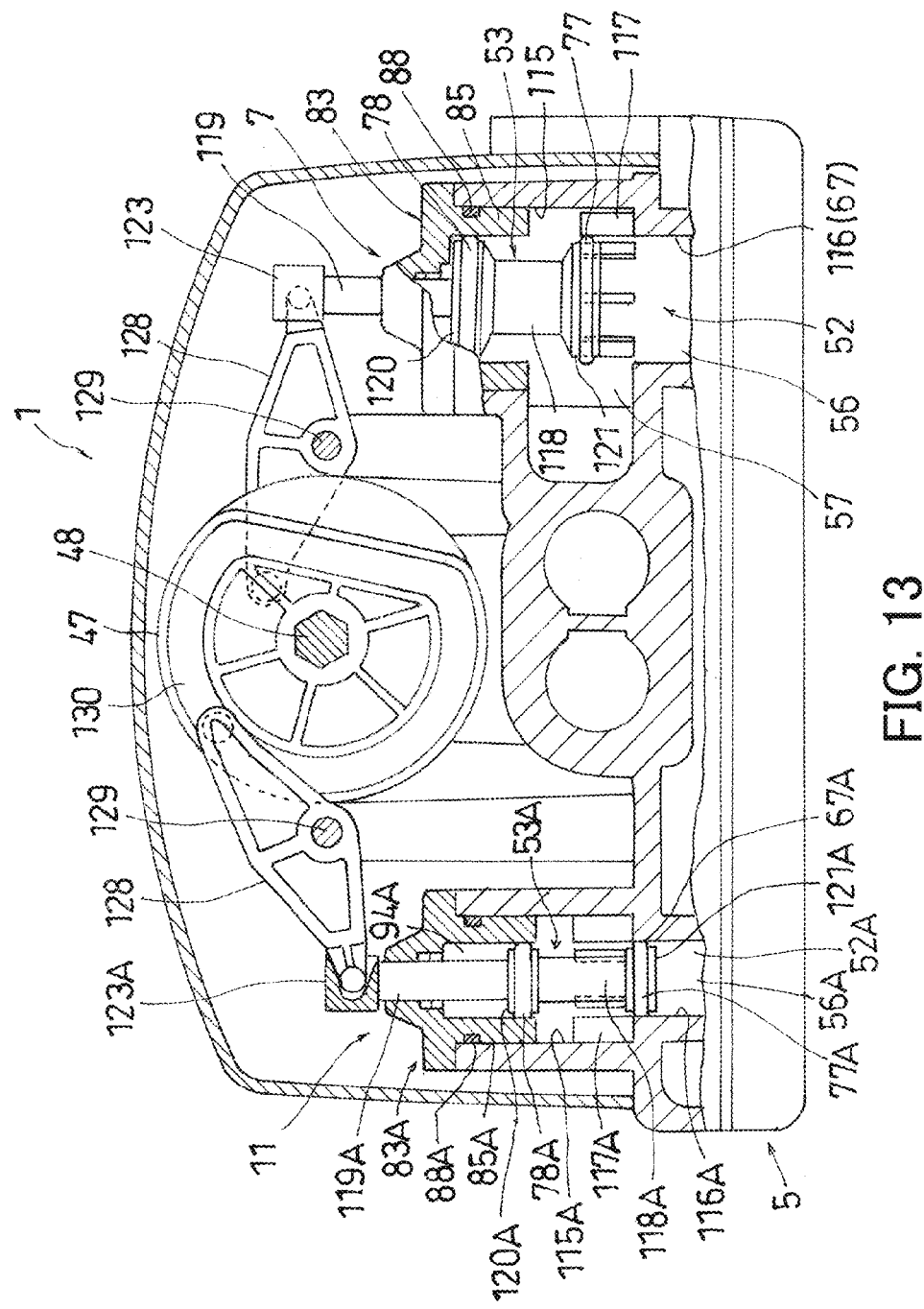
FIG. 13 shows a schematic longitudinal sectional view as viewed from the left side of the flow passage control valve of Embodiment 2, shows a second water passage valve in the first valve group, and a regeneration drain valve in the second valve group, and shows a water passing process.
Figure 14:
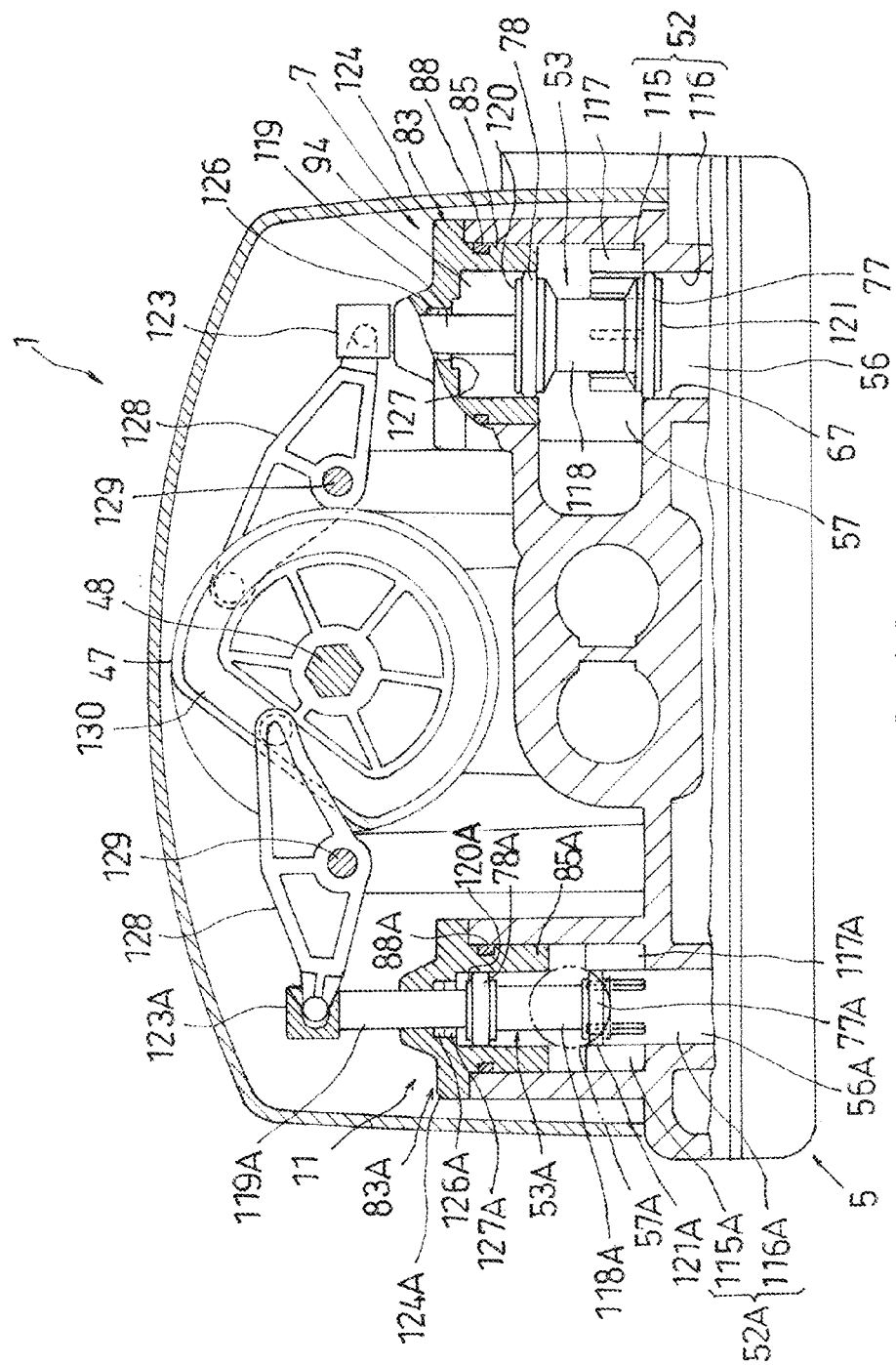
FIG. 14 shows a schematic longitudinal sectional view as viewed from the left side of the flow passage control valve of Embodiment 2, shows the second water passage valve in the first valve group, and the regeneration drain valve in the second valve group, and shows a regeneration process and an displacement process.

FIG. 13 and FIG. 14 each are a schematic longitudinal sectional view as viewed from the left side of the flow passage control valve 1 of this embodiment, and show the second water passage valve 7 in the first valve group 49, and the regeneration drain valve 11 in the second valve group 50. FIG. 13 shows a water passing process, in which the second water passage valve 7 is in a valve opening state, and the regeneration drain valve 11 is in a valve closing state. Additionally, FIG. 14 shows a regeneration process and an displacement process, in which the second water passage valve 7 is in a valve closing state, and the regeneration drain valve 11 is in a valve opening state.

Figure 15:
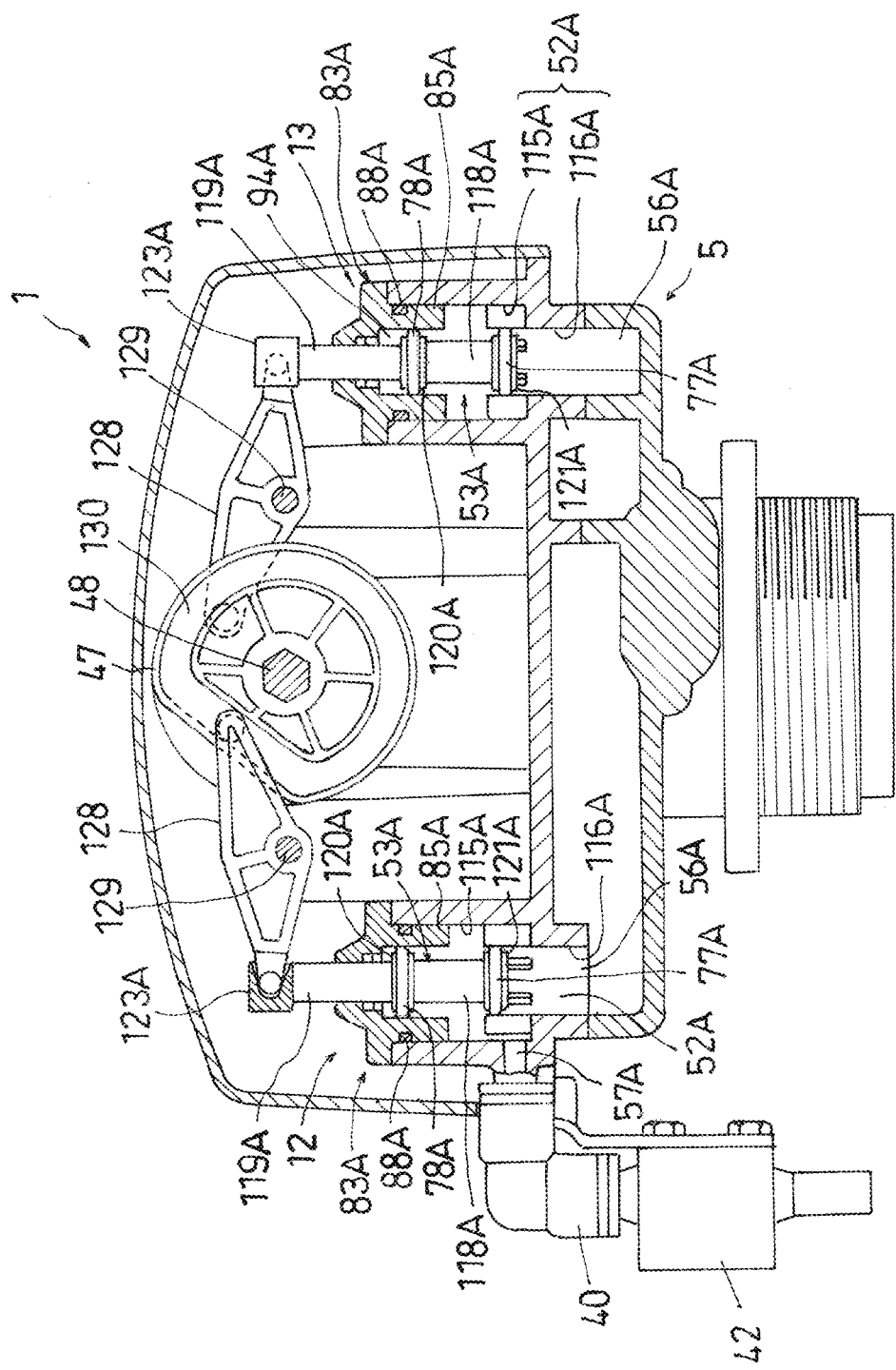
FIG. 15 is a schematic longitudinal sectional view as viewed from the right side of the flow passage control valve of Embodiment 2, shows a regeneration valve in the first valve group, and a distribution valve in the second valve group, and shows a regeneration process.

FIG. 15 is a schematic longitudinal sectional view as viewed from the right side of the flow passage control valve 1 of this embodiment, and shows the regeneration valve 12 in the first valve group 49, and the distribution valve 13 in the second valve group 50. Herein, a regeneration process is shown, the regeneration valve 12 is in a valve opening state, and the distribution valve 13 is also in a valve opening state. In FIG. 15, the shapes of cams 47 and a pin groove 130 of the cam 47 are simplified, and different from actual shapes.

In each of the valves 6 to 13 in the first valve group 49 and the second valve group 50, a valve piston 53 (53A) is retractably provided in a valve housing hole 52 (52A) formed in the valve housing 5. The valve housing hole 52 (52A) is provided vertically so as to be opened to the upper part of the of the valve housing 5.

The respective valves except the regeneration valve 12 in the valves that configure the first valve group 49 (the first water passage valve 6, the second water passage valve 7, and the bypass valve 8) have the same configuration. Specifically, description will be hereinafter made with reference to FIG. 11 to FIG. 14. The valve housing hole 52 is opened to the upper part of the valve housing 5 as described above, a side close to the opening (i.e., upper side) is referred to as a proximal end side, and a side opposite to this (i.e., lower side) is referred to as a distal end side.

Each valve housing hole 52 is formed as a stepped hole, in which a large diameter hole 115 is arranged at the upper part, and a small diameter hole 116 is arranged at the lower part. The upper part of the inside of the small diameter hole 116 of the valve housing hole 52 functions as a valve seat part 67. However, in some cases, a stepped part of the valve housing hole 52 may be utilized as the valve seat part 67.

A plurality of ribs 117 are provided in the lower part of the large diameter hole 115 of the valve housing hole 52 at equal intervals in the peripheral direction. The ribs 117 each protrude to the inside in the radial direction from a peripheral side wall of the large diameter hole 115, and are formed along the axial direction of the large diameter hole 115. Consequently, the lower end of the valve piston 53 is guided by protrusion distal ends, protruding to the inside in the radial direction, of the respective ribs 117, to be movable along the axis of the valve housing hole 52.

The valve housing hole 52 is formed with a first opening 56 and a second opening 57 that serve as the doorways of fluid to the valve housing hole 52, at axially separated positions. The first opening 56 is provided in the lower part of the small diameter hole 116 (a peripheral side wall or a lower wall), and the second opening 57 is provided in the peripheral side wall of the large diameter hole 115.

With reference to FIG. 10, in the first water passage valve 6, the first opening 56 is communicated with an upper water passage port 17, the second opening 57 is communicated with the raw water inlet 22. In the second water passage valve 7, the first opening 56 is communicated with the lower water passage port 19, and the second opening 57 is communicated with the treated water outlet 23. In the bypass valve 8, the first opening 56 is communicated with the treated water outlet 23, and the second opening 57 is communicated with the raw water inlet 22.

The valve housing hole 52 is retractably mounted with the valve piston 53. The valve piston 53 is formed in a stepped cylindrical shape, and includes a large diameter part 118 and a small diameter part 119 in the lower part and the upper part, respectively. The axial both ends of the large diameter part 118 are enlarged diameter parts 120 and 121 having larger diameter, the enlarged diameter parts have outer peripheral parts formed with annular grooves. The lower annular groove is provided with a first seal material 77, and the upper annular groove is provided with a second seal material 78. The seal materials 77 and 78 each are, for example, an annular X-ring having an X-shaped cross-section.

The enlarged diameter part 121 in the lower part of the valve piston 53 is mounted with the first seal material 77, and is guided by the respective ribs 117 at the lower part of the large diameter hole 115 of the valve housing hole 52 to vertically move, and to be able to be fitted in the upper part of the small diameter hole 116. On the other hand, the enlarged diameter part 120 in the upper part of the valve piston 53 is mounted with the second seal material 78, and slides a cylinder 85 of a valve cap 83.

The upper end of the small diameter part 119 of the valve piston 53 is opened only upward, and is formed with a screw hole 122. In this screw hole 122, a piston hook 123 is mountable, as described later. On the other hand, the large diameter part 118 of the valve piston 53 is formed with communication holes 76 that vertically penetrate. These communication holes 76 are opened to the lower end of the large diameter part 118, and opened at a plurality of places in the peripheral direction on stepped surfaces of the large diameter part 118 and the small diameter part 119.

The valve piston 53 is incorporated in the valve housing hole 52, and an opening is sealed by the valve cap 83. The valve cap 83 includes a substantially rectangular top plate 124, and the cylindrical cylinder 85 that extends downward is integrally formed on the lower surface of the top plate 124. The cylinder 85 is fitted in the an upper opening of the valve housing hole 52 (upper part of the large diameter hole 115), thereby mounting the valve cap 83. At this time, the lower surface of the top plate 124 of the valve cap 83 is in contact with the upper surface of the peripheral side wall of the valve housing hole 52. Additionally, a screw 125 is screwed in the valve housing 5 through the top plate 124, so that both are integrated with each other. At this time, a clearance between the valve housing 5 and the valve cap 83 is sealed by an O-ring 88. Thus, the valve cap 83 is detachably mounted on the upper end of the valve housing hole 52.

The small diameter part 119 of the valve piston 53 passes through the valve cap 83 in a watertight state. That is, the top plate 124 of the valve cap 83 has a through hole at the central part, and the small diameter part 119 of the valve piston 53 passes through the through hole. A clearance between the valve piston 53 and the valve cap 83 is sealed by an O-ring 126 held by the valve cap 83. This O-ring 126 is mounted from the lower part of the valve cap 83, and is held by a seal holder 127 that is mounted on the lower surface of the top plate 124 of the valve cap 83.

As described above, the small diameter part 119 of the valve piston 53 is formed with the screw hole 122 that is opened upward, and this screw hole 122 is mounted with the piston hook 123. Through this piston hook 123, the valve piston 53 can be vertically moved by a lever 128.

Specifically, at the upper part of the valve housing 5, lever shafts 129 are mounted at the front and the rear of the camshaft 48 in parallel with the camshaft 48. A plurality of levers 128 are swingably provided on the respective lever shaft 129. In each lever 128, while a first end is swingably held by the piston hook 123 in the upper end of the valve piston 53, a pin of the second end is engaged with the pin groove 130 on the side surface of the cam 47. Consequently, each lever 128 moves around the lever shaft 129 in accordance with the shape of the pin groove 130 on the side surface of the cam 47, so that the valve piston 53 can be vertically moved.

As shown in FIG. 11, in this embodiment, the four cams 47 are arranged, and each cam 47 has one end surface, with which the lever 128 for operating each valve in the first valve group 49 is engaged, and the other end surface, with which the lever 128 for operating each valve in the second valve group 50 is engaged.

As shown in the right of FIG. 14, in a state where the valve piston 53 is pressed downward, and the enlarged diameter part 121 (first seal material 77) in the lower part of the valve piston 53 is fitted in the small diameter hole 116 of the valve housing hole 52, the communication between the first opening 56 and the second opening 57 is blocked. On the contrary, as shown in FIG. 13, in a state where the valve piston 53 is pulled upward, and the enlarged diameter part 121 in the lower part of the valve piston 53 is pulled out of the small diameter hole 116 of the valve housing hole 52, the communication between the first opening 56 and the second opening 57 is secured.

The enlarged diameter part 120 (second seal material 78) in the upper part of the valve piston is fitted in the cylinder 85 of the valve cap 83, and slides in the cylinder 85. A chamber 94 is formed between the valve piston 53 and the cylinder 85 of the valve cap 83 (FIG. 14). This chamber 94 is communicated with the side of the first opening 56 through the communication holes 76 of the valve piston 53 (FIG. 12). Accordingly, in the valve closing state, the chamber 94 is communicated with the first opening 56 on the distal end side through the communication holes 76 of the valve piston 53, thereby balancing a part of or all of fluid pressure in the valve opening direction and a part of or all of fluid pressure in the valve closing direction, which are applied to the valve piston 53. Consequently, even in a case where the first opening 56 is used as a fluid inlet side (high pressure side), it is possible to reduce driving force required for valve opening/closing.

In addition to the respective valves (the regeneration drain valve 11, the backwash drain valve 9, the rinse drain valve 10, and the distribution valve 13), that configure the second valve group 50, the regeneration valve 12 in the first valve group 49 is smaller than each of the valves (the first water passage valve 6, the second water passage valve 7, and the bypass valve 8) that configure the first valve group 49 except the regeneration valve 12, but has basically similar configuration to each of the valves 6 to 8. Therefore, difference between both will be hereinafter mainly described, and corresponding parts are followed by the same reference numerals. However, in order to simply distinguish a configuration of each of the valves in the first valve group 49 except the regeneration valve 12 from a configuration of each of the valves in the second valve group 50 (and the regeneration valve 12 in the first valve group 49), the latter configuration is followed by a subscript "A". For example, while the valve piston in the first valve group 49 is denoted by "valve piston 53", the valve piston in the second valve group 50 is denoted by "valve piston 53A".

With reference to FIG. 10, in the regeneration valve 12, the first opening 56A is communicated with the suction port 38 of the ejector 30, and the second opening 57A is communicated with the regenerant port 40. In the distribution valve 13, the first opening 56A is communicated with an outlet of the ejector 30, and the second opening 57A is communicated with the lower water passage port 19. In the regeneration drain valve 11, the first opening 56A is communicated with the central water passage port 21, and the second opening 57A is communicated with the drain outlet 25. In the backwash drain valve 9, the first opening 56A is communicated with the upper water passage port 17, and the second opening 57A is communicated with the drain outlet 25. In the rinse drain valve 10, the first opening 56A is communicated with the lower water passage port 19, and the second opening 57A is communicated with the drain outlet 25.

As shown in FIG. 12, in each of the valves 6 to 8 in the first valve group 49 except the regeneration valve 12, the communication holes 76 of the valve piston 53 are opened in the lower end surface of the large diameter part 118 and the stepped surface. In each of the respective valves 9, 10, 11 and 13 in the second valve group 50, and the regeneration valve 12 in the first valve group 49, the communication holes 76A of the valve piston 53A are opened in the lower end surface of the large diameter part 118A and the peripheral side surface of the small diameter part 119A. That is, openings are formed at a plurality of places in the peripheral direction in the lower part of the peripheral side wall of the small diameter part 119A, and each opening is the upper opening of each communication hole 76A. The communication holes 76A are also opened to the lower end surface of the valve piston 53A. Additionally, in each of the valves 9, 10, 11 and 13 in the second valve group 50, and the regeneration valve 12 in the first valve group 49, the large diameter part 118A and the small diameter part 119A of the valve piston 53A have substantially the same diameter.

The respective valves 6 to 13 in the first valve group 49 and the second valve group 50 are slightly different from each other in design of the valve cap 83 (83A) and the valve piston 53 (53A), and the like in addition to the above, but there is no basic difference between both, and therefore description will be omitted.

Figure 16:
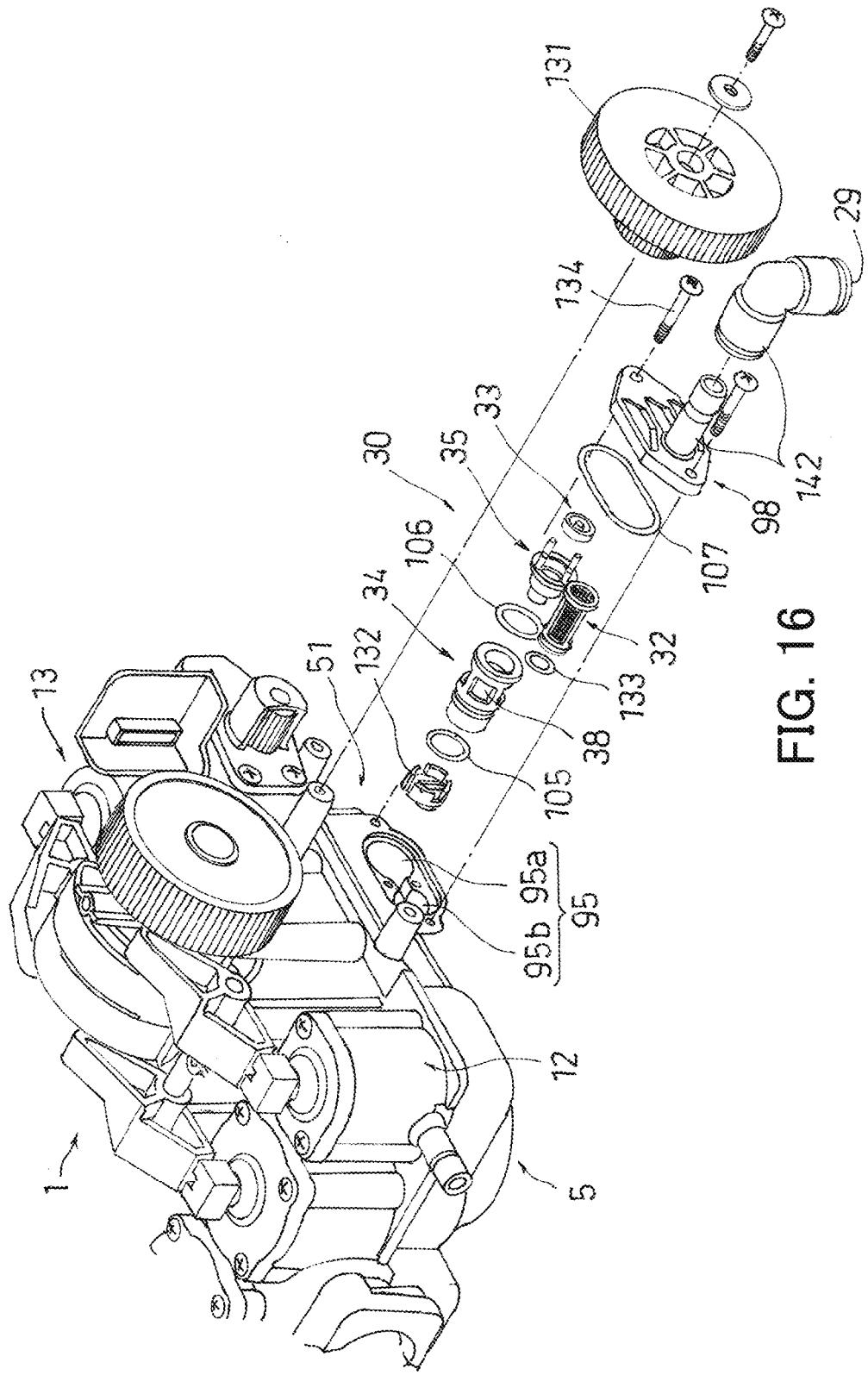
FIG. 16 is an exploded perspective view of a state where a part of gears is removed in addition to an ejector of the flow passage control valve of Embodiment 2, and peripheral components therearound.
Figure 17:
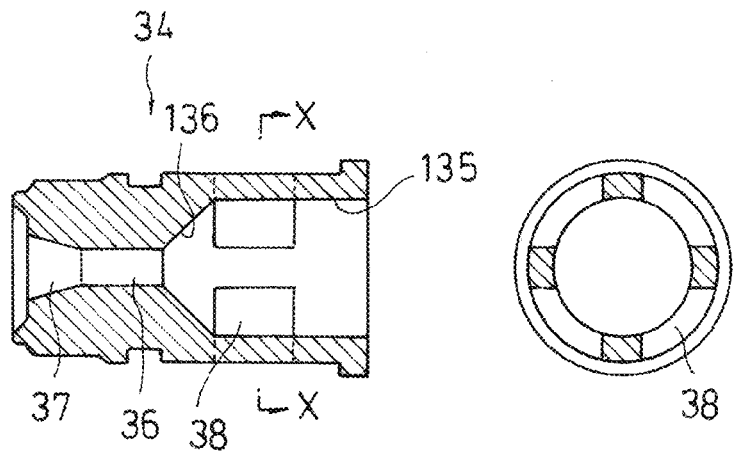
FIG. 17 is a component figure of an ejector body of the flow passage control valve of Embodiment 2, and shows a longitudinal sectional view and a X-X sectional view thereof.
Figure 18:
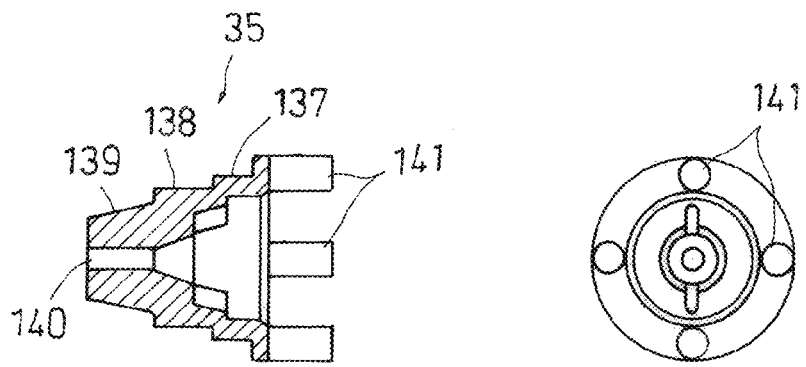
FIG. 18 is a component figure of a nozzle of the flow passage control valve of Embodiment 2, and shows a longitudinal sectional view and a right side view thereof.
Figure 19:
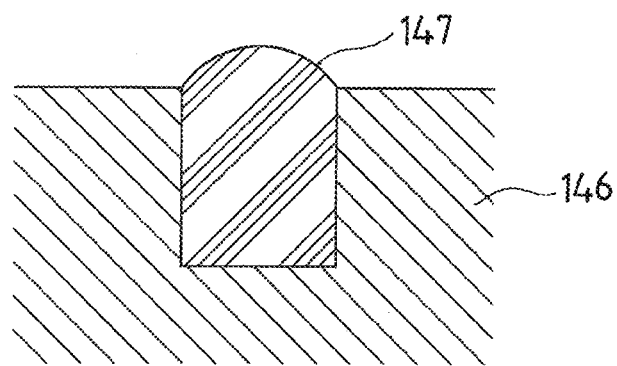
FIG. 19 is a schematic sectional view showing an example of molecularly bonding plastics of a resin molding component to rubber of a seal ring.
Figure 20:
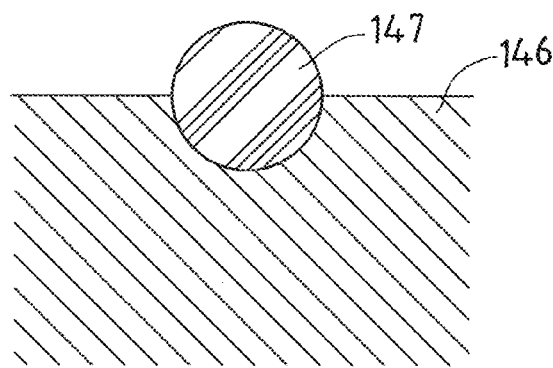
FIG. 20 is a schematic sectional view showing an example of molecularly bonding plastics of a resin molding component to rubber of a seal ring.
Figure 21:
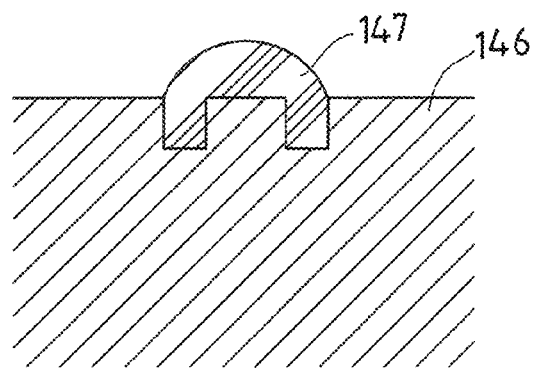
FIG. 21 is a schematic sectional view showing an example of molecularly bonding plastics of a resin molding component to rubber of a seal ring.
Figure 22:
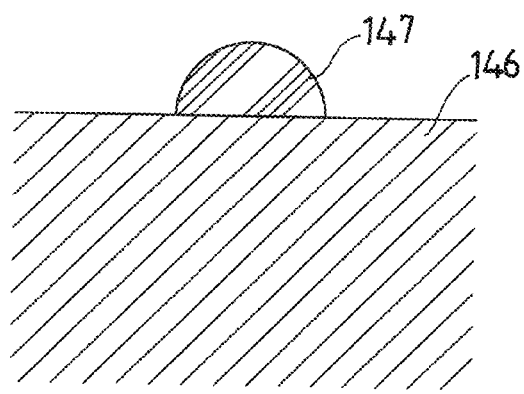
FIG. 22 is a schematic sectional view showing an example of molecularly bonding plastics of a resin molding component to rubber of a seal ring.
Figure 23:
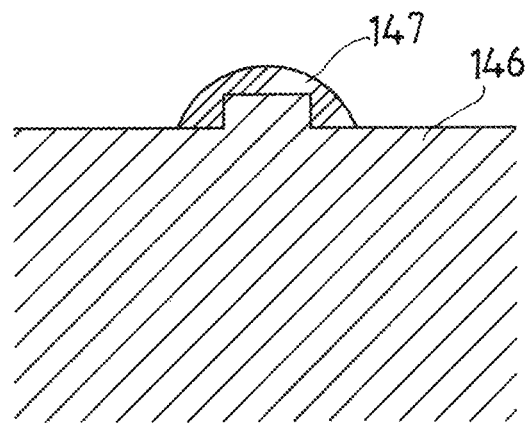
FIG. 23 is a schematic sectional view showing an example of molecularly bonding plastics of a resin molding component to rubber of a seal ring.
Figure 24:
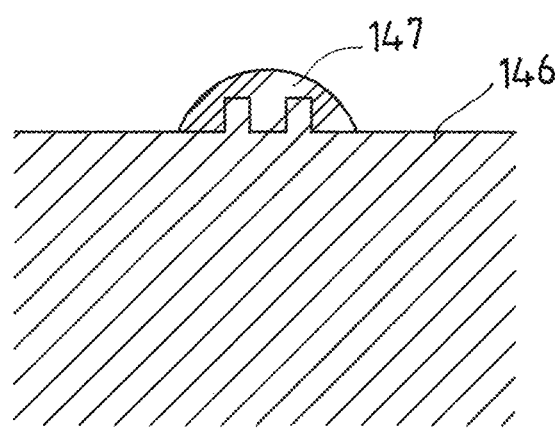
FIG. 24 is a schematic sectional view showing an example of molecularly bonding plastics of a resin molding component to rubber of a seal ring.

FIG. 16 is an exploded perspective view of a state where a part of gears 131 is removed, in addition to the ejector 30 and peripheral components thereof. Additionally, FIG. 17 is a component figure of an ejector body 34, and shows a longitudinal sectional view and a X-X sectional view thereof. Furthermore, FIG. 18 is a component figure of a nozzle 35, and shows a longitudinal sectional view and a right side view thereof.

The ejector housing part 51 is provided between the regeneration valve 12 and the distribution valve 13, in other words, on the right lower part of the central part in the front and rear direction of the valve housing 5 in FIG. 11 and FIG. 16. As shown in FIG. 16, at this place, an ejector housing hole 95 that is opened to the right of the valve housing 5 is formed. The ejector body 34, the nozzle 35, a constant flow valve 33, a strainer 32, and the like are incorporated in the ejector housing hole 95, and an opening is sealed by a lid material 98.

In Embodiment 2, the ejector housing hole 95 is configured from an ejector body housing hole 95a and a strainer housing hole 95b. The ejector body housing hole 95a and the strainer housing hole 95b are arranged adjacent to each other on the front and the rear so as to be parallel to each other, and are provided from the right side part of the valve housing 5 to the left side. The distal end of the strainer housing hole 95b is closed. Additionally, the ejector body housing hole 95a and the strainer housing hole 95b are communicated with each other only at the proximal end (on the side of an opening that is opened/closed by the lid material 98).

The ejector body housing hole 95a incorporates the ejector body 34, the nozzle 35, and the constant flow valve 33 in order. Additionally, a distribution plate 132 is also arranged in the distal end side of the ejector body 34. This distribution plate 132 is a component for evenly distributing regenerant from the ejector 30 into a first regeneration passage 43 and a second regeneration passage 44.

On the other hand, the strainer housing hole 95b incorporates the strainer 32 through an O-ring 133. Openings of the ejector body housing hole 95a and the strainer housing hole 95b are sealed by the common lid material 98. At this time, a screw 134 is screwed in the valve housing 5 through the lid material 98, so that the lid material 98 is detachably provided in the valve housing 5. Additionally, a clearance between the ejector body 34 and the ejector body housing hole 95a of the valve housing 5 is sealed by an O-ring 105. Similarly, a clearance between the ejector body 34 and the nozzle 35, and a clearance between the ejector body 34 and the ejector body housing hole 95a, a clearance between the nozzle 35 and the ejector body housing hole 95a are sealed by an O-ring 106. Furthermore, a clearance between the valve housing 5 and the lid material 98 is sealed by an O-ring 107.

As shown in FIG. 17, the ejector body 34 is substantially cylindrical, and a hollow hole thereof includes a cylindrical part 135 that is opened to the proximal end side, a tapered part 136 that is formed in the distal end of the cylindrical part 135 so as to be tapered, a throat part 36 that is formed at the central part of the tapered part 136 along the axial direction, and a diffuser part 37 that is formed in the distal end of the throat part 36 and has a diameter which increases to the distal end side. Additionally, the cylindrical part 135 is formed with a suction port 38 in a peripheral side wall thereof.

As shown in FIG. 18, the nozzle 35 is formed in a stepped cylindrical shape, and formed with a large diameter part 137, a small diameter part 138, and a truncated cone shaped part 139 in order from the proximal end side toward the distal end side. An inner hole of the nozzle 35 is formed to have a diameter gradually decreasing toward the distal end side, and is formed with a nozzle hole 140 in the distal end.

Leg parts 141 are formed in the proximal end of the large diameter part 137 of the nozzle 35 at equal intervals in the peripheral direction so as to extend to the proximal end side. These leg parts 141 position the ejector 30 (the ejector body 34 and the nozzle 35) in the ejector body housing hole 95a, and secure an inflow space of driving water from the strainer 32 at the proximal end of the ejector body housing hole 95a.

The constant flow valve 33 is fitted in the large diameter part 137 of the nozzle 35. The constant flow valve 33 is a rubber orifice that is formed with a through hole at the disk-shaped central part. On the other hand, the strainer 32 is cylindrical, and has a peripheral side wall formed in a net form.

The lid material 98 of the ejector housing part 51 is formed with a driving water inlet pipe 142, and driving water is supplied to the inside of the strainer 32. The water passes from the inside of the strainer 32 to the outside, advances from the proximal end of the ejector body housing hole 95a to the distal end side, and is jetted from the nozzle 35. With this jetted water, regenerant is sucked from the regenerant port 40 to the suction port 38, and mixed water of the regenerant and the driving water is discharged from the ejector 30.

As described above, the cams 47 operate the opening/closing of the respective valves 6 to 13 in the first valve group 49 and the second valve group 50 through the levers 128. That is, the cams 47 are mounted on the camshaft 48 so as to correspond to the respective valves 6 to 13, and have the side surfaces formed with the pin grooves 130. On the other hand, in each lever 128, while the first end is held by the piston hook 123 (123A) in the upper end of the valve piston 53 (53A), the pin at the second end is engaged with the pin groove 130 on the side surface of the cam 47. Accordingly, in Embodiment 2, it is possible to vertically move the valve pistons 53 (53A) by the levers 128 without using springs.

When each lever 128 presses the valve piston 53 (53A) downward with the rotation of the camshaft 48, the lower end of the valve piston 53 (53A) is fitted in the small diameter hole 116 (116A), thereby resulting in a valve closing state. On the contrary, when each lever 128 pulls the valve piston 53 (53A) upward with the rotation of the camshaft 48, the lower end of the valve piston 53 (53A) is pulled from the small diameter hole 116 (116A), thereby resulting in a valve opening state.

The shapes of the pin grooves 130 corresponding to the respective valves 6 to 13 are changed, thereby enabling the control of the opening/closing states as shown in FIG. 2. The rotation of the cams 47 is performed by rotating the camshaft 48 with a motor. Specifically, when the motor is rotated, the rotating force is transmitted to the camshaft 48 through a speed reducing gear train 109, so that the cams 47 can be rotated. The cams 47 are intermittently rotated in each process.

As shown in FIG. 11, the camshaft 48 is provided with two sensor plates 143 and 144. The first sensor plate 143 is formed with a notch 113 for origin detection at a single place in the peripheral direction, and the second sensor plate 144 is formed with notches 114 for process detection corresponding to the respective process positions. Each of the notches 113 and 114 of the sensor plates 143 and 144 is readable by a photo sensor (not shown) such as a photo interrupter. Accordingly, the origin positions and the present positions of the cams 47 (i.e., which process is being performed) can be confirmed by the sensors. Additionally, a process instruction plate 145 is provided in the end of the camshaft 48 in order to enable visual confirmation of such a process position.

In each of the above embodiments, the valve housing 5, the valve frames 58 (58A), the valve pistons 53 (53A), the valve caps 83 (83A), and the like of the flow passage control valve 1 are resin molding components. Seal rings such as an O-ring and an X-ring are mounted on these components, and places where clearances with other members are sealed are present. For example, the first seal material 77 (77A) and the second seal material 78 (78A) are mounted on each valve piston 53 (53A), and the clearances with the valve seat part 67 and the cylinder 85 are sealed.

Conventionally, in a fluid seal structure in a resin molding component, an annular groove is formed in the resin molding component, and is fitted with a seal ring. However, a condition for employing this method is that the seal ring is sandwiched between two sliding members. In a case where the condition is not satisfied, there is a risk that the seal ring comes off the annular groove due to negative pressure by the flow velocity of fluid. In order to prevent this, the seal ring needs to have a large inner diameter side that is mounted on the resin molding component, so that the seal ring is hooked to the annular groove.

On the other hand, plastics of a resin molding component 146 and rubber of a seal ring 147 may be molecularly bonded to each other. Specifically, for example, in each of shapes shown in FIG. 19 to FIG. 24, the resin molding component 146 is set on a rubber molding die, and the resin and the rubber are bonded by using vulcanization reaction of the rubber, thereby forming the seal ring 147. In this method, there is almost no interface between rubber and resin, and therefore a device for falling-off prevention to a resin-side molding groove or the like is unnecessary. Such a bonding method is applicable to each seal part of each of the above embodiments.

The flow passage control valve 1 of the present invention is not limited to the configuration of each of the above embodiments, and can be appropriately changed. For example, in each of the above embodiments, the ion exchange apparatus 2 is a hard water softening apparatus that removes hardness components in raw water by using cation exchange resin. However, the ion exchange apparatus 2 is not limited to the hard water softening apparatus, and may be, for example, an apparatus for removing nitrate nitrogen that uses anion exchange resin. Additionally, the ion exchange apparatus 2 may be, for example, a two-bed and two-tower type pure water making apparatus, a mixed bed tower type pure water making apparatus, or the like that uses cation exchange resin and anion exchange resin.

In each of the above embodiments, the flow passage control valve 1 includes the eight valves, but the number of valves may be changeable according to the configuration of the ion exchange apparatus 2. Also in this case, the first valve group 49 preferably includes the first water passage valve 6, the second water passage valve 7, and the bypass valve 8, the regeneration valve 12 is preferably included in either the first valve group 49 or the second valve group 50, and remaining valves that are not included in the first valve group 49 are preferably included in the second valve group 50.

The regeneration valve 12 and the distribution valve 13 are arranged adjacent to each other in Embodiment 1, and are arranged so as to face each other in Embodiment 2. However, the regeneration valve 12 and the distribution valve 13 may be arranged to be face each other in Embodiment 1, or may be arranged adjacent to each other in Embodiment 2.

The configurations of the respective valves 6 to 13 are not limited to those of the above embodiments. Also in this case, in each of the valves 6 to 13, the valve piston 53 is preferably retractably provided in the housing hole 52 formed in the valve housing 5. Then, the valve piston 53 preferably brings the first seal material 77 into contact with the valve seat part 67 (may be a valve hole like Embodiment 2), so that the communication between the first opening 56 and the second opening 57 is blocked. In this state, the second seal material 78 preferably forms with the chamber 94 in the proximal end of the valve housing hole 52, so that the chamber 94 is communicated with the first opening 56 through the communication holes 76 of the valve piston 53.

The invention may be embodied in other specific forms without departing from the spirit or essential characteristics thereof. The above embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

EXPLANATION OF REFERENCE NUMERALS

1: Flow passage control valve
2: Ion exchange apparatus
3: Pressure tank
4: Regenerant tank
5: Valve housing
6: First water passage valve
7: Second water passage valve
8: Bypass valve
9: Backwash drain valve
10: Rinse drain valve
11: Regeneration drain valve
12: Regeneration valve
13: Distribution valve
14: First water passage
15: Second water passage
16: Regeneration drain passage
17: Upper water passage port
18: Inner pipe
19: Lower water passage port
20: Outer pipe
21: Central water passage port
22: Raw water inlet
23: Treated water outlet
24: Bypass passage
25: Drain outlet
26: Backwash drain passage
27: Rinse drain passage
28: Constant flow valve
29: Driving water inlet
30: Ejector
31: Driving water passage
32: Strainer
33: Constant flow valve
34: Ejector body
35: Nozzle
36: Throat part
37: Diffuser part
38: Suction port
39: Regenerant passage
40: Regenerant port
41: Regenerant pipe
42: Regenerant flowmeter
43: First regeneration passage
44: Second regeneration passage
45: First orifice
46: Second orifice
47: Cam
48: Camshaft
49: First valve group
50: Second valve group
51: Ejector housing part
52: Valve housing hole
53: Valve piston
56: First opening
57: Second opening
58: Valve frame
64, 65: Opening
66: Annular part
67: Valve seat part
70: Valve shaft
76: Communication hole
77: First seal material
78: Second seal material
82: Spring
83: Valve cap
84: Cap body
85: Cylinder (cylindrical material)
94: Chamber
95: Ejector housing hole
98: Lid material
108: Motor
109: Speed reducing gear train
110: Cam gear
115: Large diameter hole (of valve housing hole)
116: Small diameter hole (of valve housing hole)
128: Lever
129: Lever shaft
130: Pin groove

The invention claimed is:

1. A flow passage control valve for connection to a pressure tank for housing an ion exchange resin bed and for connection to a regenerant tank for storing regenerant of the ion exchange resin bed, the flow passage control valve comprising:
a plurality of valves provided in a valve housing formed with set flow passages, wherein
a camshaft for operating each of the valves is provided at an upper part of the valve housing along a right and left direction,
the plurality of valves are arranged so as to be divided front and rear into a first valve group and a second valve group with the camshaft as a border therebetween,
in the first valve group, a first water passage valve that is provided in a first water passage for connecting a raw water inlet to the pressure tank, a second water passage valve that is provided in a second water passage for connecting the pressure tank to a treated water outlet, and a bypass valve that is provided in a bypass passage for connecting the first water passage and the second water passage are laterally arranged side by side,
a regeneration valve that is provided in a regenerant passage for allowing the regenerant of the ion exchange resin bed to pass is included in either the first valve group or the second valve group, and
in the second valve group, remaining valves that are not included in the first valve group are laterally arranged side by side.

2. The flow passage control valve according to claim 1, wherein
the pressure tank includes an upper water passage port, a lower water passage port, and a central water passage port,
the valve housing includes a regenerant port for connection to the regenerant tank, in addition to the raw water inlet, the treated water outlet, and a drain outlet,
the valve housing is provided with an ejector for sucking the regenerant from the regenerant tank,
a flow passage on an outlet side of the ejector is branched into a first regeneration passage for connection to the upper water passage port, and a second regeneration passage for connection to the lower water passage port,
the first water passage valve is provided in the first water passage for connecting the raw water inlet to the upper water passage port,
the second water passage valve is provided in the second water passage for connecting the lower water passage port to the treated water outlet,
the bypass valve is provided in the bypass passage for connecting the first water passage on a side closer to the raw water inlet than the first water passage valve, and the second water passage on a side closer to the treated water outlet than the second water passage valve,
a backwash drain valve is provided in a backwash drain passage for connecting the upper water passage port to the drain outlet,
a rinse drain valve is provided in a rinse drain passage for connecting the lower water passage port to the drain outlet,
a regeneration drain valve is provided in a regeneration drain passage for connecting the central water passage port to the drain outlet,
the regeneration valve is provided in the regenerant passage for connecting the regenerant port to a suction port of the ejector,
a distribution valve is provided in the second regeneration passage,
the first valve group includes the first water passage valve, the second water passage valve, and the bypass valve,
the second valve group includes the backwash drain valve, the rinse drain valve, the regeneration drain valve, and the distribution valve, and
the regeneration valve is included in either the first valve group or the second valve group.

3. The flow passage control valve according to claim 2, wherein
as arrangement of the respective valves in the first valve group and the second valve group,
the bypass valve is arranged between the first water passage valve and the second water passage valve,
the backwash drain valve and the rinse drain valve are arranged adjacent to each other, and the regeneration drain valve is arranged adjacent to the backwash drain valve,
the regeneration valve and the distribution valve are arranged adjacent to each other or arranged so as to face each other,
the raw water inlet and the treated water outlet are provided on a side of the first valve group, and
the drain outlet is provided on a side of the second valve group.

4. The flow passage control valve according to claim 3, wherein
each of the valves is retractably provided with a valve piston in a valve housing hole formed in the valve housing,
the valve housing hole is formed with a first opening and a second opening serving as doorways of fluid to the valve housing hole, at axially separated positions, and is provided with a valve seat part between the first opening and the second opening,
the valve piston is provided with a first seal material and a second seal material at axially separated positions, and
in a state where communication between the first opening on a distal end side and the second opening on a proximal end side is blocked by bringing the valve seat part into contact with the first seal material, the second seal material forms a chamber in a proximal end of the valve housing hole, and the chamber is communicated with the first opening through a communication hole of the valve piston.

5. The flow passage control valve according to claim 4, wherein
the valve housing hole is horizontally provided so as to be opened to outside in a front and rear direction of the valve housing, and is provided with the first opening and the second opening in a lower part of a peripheral side wall,
the valve housing hole incorporates a valve frame, the valve piston, and a spring in order, and an opening is sealed by a detachable valve cap,
the valve frame has a substantially cylindrical shape in which an opening is formed in a peripheral side wall, allows communication between the first opening and the second opening only through an inner hole, is provided with an annular valve seat part in an axial middle part, and is retractably provided with a valve shaft in a distal end in a watertight state,
the valve piston is urged to a distal end side by the spring, and is capable of being pressed back to a proximal end side by the valve shaft against urging force, and
the valve shaft is retractably operated by a cam provided in the camshaft.

6. The flow passage control valve according to claim 4, wherein
the valve housing hole is vertically provided so as to be opened to an upper side of the valve housing, is formed with the first opening in a peripheral side wall below the valve seat part or a lower wall, and is formed with the second opening in a peripheral side wall above the valve seat part,
the valve housing hole incorporates the valve piston, and an opening is sealed by a detachable valve cap,
an upper end of the valve piston passes through the valve cap in a watertight state,
the valve piston has a lower end provided with the first seal material, and a vertical middle part provided with the second seal material, and the second seal material slides a cylinder of the valve cap, and
the valve piston is retractably operated by a cam provided in the camshaft.

7. The flow passage control valve according to claim 6, wherein
at the upper part of the valve housing, lever shafts are provided at a front and a rear of the camshaft, in parallel with the camshaft,
each of the lever shafts is swingably provided with a plurality of levers, and
each of the levers has a first end that is held by an upper end of the valve piston, and a second end that engages with a pin groove formed in a side surface of the cam, and moves the first end vertically according to a shape of the pin groove.

8. The flow passage control valve according to claim 2, wherein
each of the valves is retractably provided with a valve piston in a valve housing hole formed in the valve housing,
the valve housing hole is formed with a first opening and a second opening serving as doorways of fluid to the valve housing hole, at axially separated positions, and is provided with a valve seat part between the first opening and the second opening,
the valve piston is provided with a first seal material and a second seal material at axially separated positions, and
in a state where communication between the first opening on a distal end side and the second opening on a proximal end side is blocked by bringing the valve seat part into contact with the first seal material, the second seal material forms a chamber in a proximal end of the valve housing hole, and the chamber is communicated with the first opening through a communication hole of the valve piston.

9. The flow passage control valve according to claim 8, wherein
the valve housing hole is horizontally provided so as to be opened to outside in a front and rear direction of the valve housing, and is provided with the first opening and the second opening in a lower part of a peripheral side wall,
the valve housing hole incorporates a valve frame, the valve piston, and a spring in order, and an opening is sealed by a detachable valve cap,
the valve frame has a substantially cylindrical shape in which an opening is formed in a peripheral side wall, allows communication between the first opening and the second opening only through an inner hole, is provided with an annular valve seat part in an axial middle part, and is retractably provided with a valve shaft in a distal end in a watertight state,
the valve piston is urged to a distal end side by the spring, and is capable of being pressed back to a proximal end side by the valve shaft against urging force, and
the valve shaft is retractably operated by a cam provided in the camshaft.

10. The flow passage control valve according to claim 8, wherein
the valve housing hole is vertically provided so as to be opened to an upper side of the valve housing, is formed with the first opening in a peripheral side wall below the valve seat part or a lower wall, and is formed with the second opening in a peripheral side wall above the valve seat part,
the valve housing hole incorporates the valve piston, and an opening is sealed by a detachable valve cap,
an upper end of the valve piston passes through the valve cap in a watertight state,
the valve piston has a lower end provided with the first seal material, and a vertical middle part provided with the second seal material, and the second seal material slides a cylinder of the valve cap, and
the valve piston is retractably operated by a cam provided in the camshaft.

11. The flow passage control valve according to claim 10, wherein
at the upper part of the valve housing, lever shafts are provided at a front and a rear of the camshaft, in parallel with the camshaft,
each of the lever shafts is swingably provided with a plurality of levers, and
each of the levers has a first end that is held by an upper end of the valve piston, and a second end that engages with a pin groove formed in a side surface of the cam, and moves the first end vertically according to a shape of the pin groove.

12. The flow passage control valve according to claim 1, wherein
each of the valves is retractably provided with a valve piston in a valve housing hole formed in the valve housing,
the valve housing hole is formed with a first opening and a second opening serving as doorways of fluid to the valve housing hole, at axially separated positions, and is provided with a valve seat part between the first opening and the second opening,
the valve piston is provided with a first seal material and a second seal material at axially separated positions, and
in a state where communication between the first opening on a distal end side and the second opening on a proximal end side is blocked by bringing the valve seat part into contact with the first seal material, the second seal material forms a chamber in a proximal end of the valve housing hole, and the chamber is communicated with the first opening through a communication hole of the valve piston.

13. The flow passage control valve according to claim 12, wherein
the valve housing hole is horizontally provided so as to be opened to outside in a front and rear direction of the valve housing, and is provided with the first opening and the second opening in a lower part of a peripheral side wall,
the valve housing hole incorporates a valve frame, the valve piston, and a spring in order, and an opening is sealed by a detachable valve cap,
the valve frame has a substantially cylindrical shape in which an opening is formed in a peripheral side wall, allows communication between the first opening and the second opening only through an inner hole, is provided with an annular valve seat part in an axial middle part, and is retractably provided with a valve shaft in a distal end in a watertight state, the valve piston is urged to a distal end side by the spring, and is capable of being pressed back to a proximal end side by the valve shaft against urging force, and the valve shaft is retractably operated by a cam provided in the camshaft.

14. The flow passage control valve according to claim 12, wherein the valve housing hole is vertically provided so as to be opened to an upper side of the valve housing, is formed with the first opening in a peripheral side wall below the valve seat part or a lower wall, and is formed with the second opening in a peripheral side wall above the valve seat part, the valve housing hole incorporates the valve piston, and an opening is sealed by a detachable valve cap, an upper end of the valve piston passes through the valve cap in a watertight state, the valve piston has a lower end provided with the first seal material, and a vertical middle part provided with the second seal material, and the second seal material slides a cylinder of the valve cap, and the valve piston is retractably operated by a cam provided in the camshaft.

15. The flow passage control valve according to claim 14, wherein at the upper part of the valve housing, lever shafts are provided at a front and a rear of the camshaft, in parallel with the camshaft, each of the lever shafts is swingably provided with a plurality of levers, and each of the levers has a first end that is held by an upper end of the valve piston, and a second end that engages with a pin groove formed in a side surface of the cam, and moves the first end vertically according to a shape of the pin groove.

16. The flow passage control valve according to claim 12, wherein the valve housing includes an ejector for sucking the regenerant from the regenerant tank, the ejector includes an ejector body and a nozzle leading to the ejector body, a water supply passage leading to the nozzle is provided with a strainer and a constant flow valve, and an ejector housing hole formed in the valve housing incorporates the ejector body, the nozzle, the strainer, and the constant flow valve, and an opening is sealed by a detachable lid material.

* * * * *